(12) United States Patent
Zhang et al.

(10) Patent No.: US 11,913,380 B2
(45) Date of Patent: *Feb. 27, 2024

(54) GAS SOURCE SYSTEM FOR SUPPLYING COMBUSTION GAS TO A TURBINE ENGINE BY FRACTURING MANIFOLD EQUIPMENT

(71) Applicant: YANTAI JEREH PETROLEUM EQUIPMENT & TECHNOLOGIES CO., LTD., Shandong (CN)

(72) Inventors: Peng Zhang, Shandong (CN); Rikui Zhang, Shandong (CN); Xiaolei Ji, Shandong (CN); Mingchao Mao, Shandong (CN); Zhuqing Mao, Shandong (CN); Jihua Wang, Shandong (CN); Jianwei Wang, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,885

(22) Filed: Jun. 10, 2022

(65) Prior Publication Data
US 2022/0349345 A1  Nov. 3, 2022

Related U.S. Application Data

(63) Continuation-in-part of application No. PCT/CN2020/070664, filed on Jan. 7, 2020.

(30) Foreign Application Priority Data

Nov. 9, 2021 (CN) .......................... 202111317278.8
Nov. 9, 2021 (CN) .......................... 202122726296.3

(51) Int. Cl.
*F02C 7/22* (2006.01)
*E21B 43/26* (2006.01)
(Continued)

(52) U.S. Cl.
CPC .......... *F02C 7/222* (2013.01); *E21B 43/2607* (2020.05); *F02C 7/232* (2013.01);
(Continued)

(58) Field of Classification Search
CPC ...... E21B 43/2607; F02C 7/222; F02C 7/232; F02C 3/22; F02C 7/22; F17D 1/02;
(Continued)

(56) References Cited

U.S. PATENT DOCUMENTS 4,280,323 A  7/1981  Jersey
6,079,198 A  6/2000  Prowse et al.
(Continued)

FOREIGN PATENT DOCUMENTS

CN    1310292 A    8/2001
CN    203626662 U  6/2014
(Continued)

OTHER PUBLICATIONS

International Search Report dated Sep. 30, 2020, corresponding PCT/CN2020/070664.
(Continued)

*Primary Examiner* — Brad Harcourt
(74) *Attorney, Agent, or Firm* — Crowell & Moring LLP

(57) ABSTRACT

A system for supplying combustion gas to a turbine engine for fracturing operation by fracturing manifold equipment is disclosed. The system may include a gas supply device, a gas delivery manifold, a filtering device, a gas detecting system and a connecting device. The gas delivery manifold, and the filtering device, and the gas detecting system are integrated on the fracturing manifold equipment. The gas supply device is connected to the gas delivery manifold through the filtering device. The gas delivery manifold supplies gas to the turbine engine through the connecting device. The disclosed system help reduce operational risk,
(Continued)

save floor space, reduce wiring/routing of on-site delivery manifold, enhance connection efficiency, and reduce the complexity of wellsite installation.

10 Claims, 8 Drawing Sheets

(51) Int. Cl.
    *F02C 7/232* (2006.01)
    *F17D 1/02* (2006.01)

(52) U.S. Cl.
    CPC .......... *F17D 1/02* (2013.01); *F05D 2260/607* (2013.01); *F05D 2260/608* (2013.01); *F05D 2270/804* (2013.01)

(58) Field of Classification Search
    CPC ......... F05D 2260/607; F05D 2260/608; F05D 2270/804
    See application file for complete search history.

(56) References Cited

U.S. PATENT DOCUMENTS

| | | | |
|---|---|---|---|
| 10,020,711 | B2 | 7/2018 | Oehring |
| 10,830,032 | B1* | 11/2020 | Zhang .................... B01D 46/42 |
| 10,961,908 | B1* | 3/2021 | Yeung .................... F01D 15/10 |
| 2011/0118967 | A1 | 5/2011 | Tsuda |
| 2011/0290483 | A1* | 12/2011 | Zornes ................ E21B 41/0085 166/227 |
| 2012/0085079 | A1* | 4/2012 | Kaminsky ............. E21B 43/006 60/39.12 |
| 2014/0042199 | A1 | 2/2014 | Gregory, Jr. |
| 2015/0204239 | A1* | 7/2015 | Minto .................... F02C 7/228 60/741 |
| 2015/0205006 | A1 | 7/2015 | Maerten |
| 2016/0032702 | A1* | 2/2016 | Gay .......................... F17D 1/14 137/594 |
| 2017/0009666 | A1 | 1/2017 | Cano Wolff et al. |
| 2017/0052070 | A1 | 2/2017 | Marsh |
| 2017/0074074 | A1 | 3/2017 | Joseph et al. |
| 2017/0145918 | A1* | 5/2017 | Oehring .................... F02C 7/22 |
| 2017/0203241 | A1 | 7/2017 | Subedi |
| 2017/0321608 | A1 | 11/2017 | Crowley |
| 2019/0211661 | A1 | 7/2019 | Reckels et al. |
| 2019/0211814 | A1 | 7/2019 | Weightman et al. |
| 2019/0323428 | A1 | 10/2019 | Oehring et al. |
| 2021/0198993 | A1* | 7/2021 | Christinzio ......... B01F 33/5021 |
| 2021/0223801 | A1* | 7/2021 | Lawson ................ G01L 19/086 |
| 2021/0372256 | A1 | 12/2021 | Yeung |

FOREIGN PATENT DOCUMENTS

| | | |
|---|---|---|
| CN | 105334061 A | 2/2016 |
| CN | 106285603 A | 1/2017 |
| CN | 206205996 U | 5/2017 |
| CN | 207111064 U | 3/2018 |
| CN | 207503423 U | 6/2018 |
| CN | 109906305 A | 6/2019 |
| CN | 110469314 A | 11/2019 |
| CN | 210422814 U | 4/2020 |
| CN | 111089003 A | 5/2020 |
| CN | 112664356 A | 4/2021 |
| CN | 112879160 A | 6/2021 |
| CN | 113982758 A | 1/2022 |

OTHER PUBLICATIONS

Written Opinion dated Sep. 30, 2020, corresponding PCT/CN2020/070664.

International Search Report and Written Opinion dated Aug. 15, 2022 for International Application No. PCT/CN2022/076182.

Non-final Office Action dated Jun. 15, 2023 for U.S. Appl. No. 17/715,562.

* cited by examiner

GAS SOURCE SYSTEM FOR SUPPLYING COMBUSTION GAS TO A TURBINE ENGINE BY FRACTURING MANIFOLD EQUIPMENT

CROSS REFERENCE

This patent application is a continuation-in-part and claims the benefit of priority to PCT International Patent Application No. PCT/CN2020/070664, filed on Jan. 7, 2020, and is further based on and claims the benefit of priority to Chinese Patent Application No. 202111317278.8 and Chinese Patent Application No. 202122726296.3, both filed on Nov. 9, 2021. These priority applications are herein incorporated by reference in their entireties.

TECHNICAL FIELD

The present invention relates to the technical field of turbine engine-powered fracturing operation, and particularly relates to a gas supply, regulation, and control system for supplying combustion gas to one or more turbine engines via fracturing manifold equipment.

BACKGROUND

In recent decades, hydraulic fracturing has been used to increase the production in oil or gas wells. In this process, a fracturing pump is used to pump fluid into a wellbore under high pressure. Then the fluid is squeezed into the formation, creating hydraulic fractures. Water, other liquids as well as fracturing proppants are also injected into the fractures. After the formation is fractured, the fracturing fluid is returned to the ground, with the fracturing proppants remaining in the fractures to prevent closure of the fractures, through which a large amount of oil and gas enter the wellbore and is exploited and collected.

While the fracturing pump may be driven by various types of power sources, turbine engines, in particular, are advantageous because of their small size, light weight, and high power. Turbine engines, particularly the ones using natural gas (CNG) as combustion fuel, have relatively high fuel economy and can enable a fracturing system with fewer components compared to other types of engines, such as diesel engines, which are typically used to drive an electric generator and then electric motors for operating the fracturing pumps.

Combustion gas fuel may be supplied to one or more gas turbines in various manners. At existing working sites of fracturing in oil and gas fields, a typical gas source supply scheme for turbine fracturing operation may be as follows: a set of turbine fracturing trucks may be arranged side by side; gas pipelines may be connected between the turbine fracturing trucks; combustion gas filters may be disposed at the position of accessory portion of the turbine fracturing trucks; and the whole gas piping may be arranged around the truck set.

The problems associated with such typical fracturing operation are as follows:

1. Unsafety: Because the gas filters are disposed at the rear of the turbine fracturing trucks, which is usually a high-pressure region, a risk of damaging the gas filters exists. Moreover, because all gas filters need be protected and the protection of even most of gas filters is not sufficiently, the filter damage risk is effectively magnified. In addition, once a high-pressure pipeline leaks, the gas supply will need to be disconnected, affecting the operational efficiency of the wellsite. Further, in the existing gas fuel powered turbine fracturing system, there is a lack of effective purging mechanism for discharging gas fuel in the pipelines after the system is turned off from operational state.

2. Overly inter-vehicle dependent: The gas pipeline for the whole vehicle/truck set is typically arranged in an annular form. If one of the turbine fracturing trucks has to be decommissioned, moved away, or replaced, the integral piping for the whole vehicle/truck set would be broken, generating a risk of cutting off the gas supply entirely, thereby greatly affecting the operational efficiency of the wellsite.

3. Large footprint, and excessive labor and time-consumption during installation: It is necessary to temporarily install gas filters, gas pipelines and other materials after the wellsite arrangement has been completed, increasing the difficulty of wellsite installation and affecting the operating efficiency.

4. Inability to added gas fuel supply line during operation: In the existing systems, in order to add fuel line when gas fuel supply becomes in sufficient, the entire pipeline may need to be shutdown first and is incapable of adding additional gas fuel supply line in real time and during operation.

SUMMARY

One objective of the present disclosure is to provide an gas source system for supplying gas to one or more turbine engines by fracturing manifold equipment, wherein the gas delivery manifold and gas filtering devices are integrated on or with the manifold equipment at the fracturing site, thereby avoiding separate on-site wiring/routing of the gas delivery manifold, saving installation time, reducing complexity of wellsite installation, and improving installation efficiency. Various gas filtering devices are disposed in locations that also help reduces risk associated with high pressure region in the system.

In some example implementations, the connecting device as implemented further enables more flexible gas supply in a parallel configuration with respect to a plurality of turbine engines being operated, so that a decommission, movement, or replacement of a single turbine fracturing truck only involves shutting off relevant valves and disconnecting certain interfaces, and does not affect the gas supply to other turbine engines. In some other example implementations, a guard structure is configured to isolate the fracturing manifold from the gas delivery manifold, improving the safety of the fracturing operation.

For example, the above objective of the present disclosure is achieved by implementing a gas source system for supplying combustion gas to one or more turbine engines by fracturing manifold equipment, including an gas supply device, an gas delivery manifold, a filtering device, a gas detecting system and a connecting device. The gas delivery manifold, the filtering device and the gas detecting system are integrated on the fracturing manifold equipment. The gas supply device is connected to the gas delivery manifold through the filtering device, and the gas delivery manifold supplies gas to the turbine engine through the connecting device.

Further, the gas source system for supplying gas to a turbine engine by fracturing manifold equipment may further include a guard structure, the guard structure is integrated on the fracturing manifold equipment and is used to isolate the gas delivery manifold from the fracturing manifold on the fracturing manifold equipment. Further, the guard structure may be implemented as an isolating board.

The guard structure may be made from steel. Further, the gas detecting system may include a laser gas detecting system. Further, the gas detecting system may include a pan-and-tilt laser gas detecting system. Further, the pan-and-tilt laser gas detecting system may include multiple scanning laser gas telemeters, and a pan-and-tilt mechanism may drive the scanning laser gas telemeters to detect multi-dimensional space on site in real time. Further, the connecting device may include a connecting pipeline, a valve and a fast interface, the valve may be used for the on-off of gas supply of the connecting pipeline, and the fast interface may be used for the fast connection between the connecting pipeline and the turbine engine.

Another objective of the current disclosure is to provide a system for supply filtered combustion gas for fracturing operation that are flexible and safe, and that can be monitored and configured in real time.

For example, a combustion-gas supply system, combustion-gas supply method, a device equipped with a turbine engine, and a fracturing system are disclosed. The combustion-gas supply system can supply high-pressure purging gas (for example, high pressure air) into a first sub-pipeline for gas fuel from a first gas outlet pipe through a multi-functional pipeline, to discharge residual combustion-gas in the first sub-pipeline, so as to improve the safety of the combustion-gas supply system and reduce the on-site operation complexity and cost. In addition, combustion-gas supply system can also be configured to perform pressure test on the main pipeline before operation through the multi-functional pipeline in order to reduce potential safety hazards, such as leakage of the main pipeline, in advance. The combustion-gas supply system as disclosed can also supply combustion-gas through the multi-functional pipeline when the gas supply form the main pipeline to turbine engines is insufficient, so as to facilitate a stable and continuous operation of the whole combustion-gas supply system.

At least one embodiment of the present disclosure provides a combustion-gas supply system, which includes: a main pipeline, including a first sub-pipeline and a second sub-pipeline connected with the first sub-pipeline; and a multi-functional pipeline. The first sub-pipeline may include a first gas intake pipe, a first gas supply valve and a first gas outlet pipe arranged in sequence. The first gas intake pipe may be configured to input combustion-gas. The second sub-pipeline may include a combustion-gas supply valve and a gas supply pipe. The first gas outlet pipe may be connected with the combustion-gas supply valve. The gas supply pipe may be configured to be connected with a turbine engine. The multi-functional pipeline may include a second gas intake pipe, a second gas supply valve and a second gas outlet pipe arranged in sequence, and the second gas outlet pipe may be in communication with the first gas outlet pipe.

In the implementations above, the first sub-pipeline may further include a combustion-gas pressure regulating valve located between the first gas supply valve and the first gas outlet pipe; and a bypass one-way valve. An input end of the bypass one-way valve may be communicated with the first gas outlet pipe. An output end of the bypass one-way valve may be located between the combustion-gas pressure regulating valve and the first gas supply valve. The bypass one-way valve is able to be flowed through in a direction from the input end to the output end, and is not able to be flowed through in a direction from the output end to the input end.

In any one of the implementations above, the first sub-pipeline may further includes: at least one gas filter, located between the first gas supply valve and the combustion-gas pressure regulating valve; and a gas source pressure gauge, located between the first gas supply valve and the gas filter, or located between the first gas intake pipe and the first gas supply valve. The output end of the bypass one-way valve may be located between the gas filter and the combustion-gas pressure regulating valve.

In any one of the implementations above, the first sub-pipeline may further include a first pressure sensor. The first pressure sensor may be located between the first gas supply valve and the gas filter, and the first pressure sensor may be configured to monitor gas supply pressure in real time.

In any one of the implementations above, the combustion-gas supply system may further include: a blowdown valve, located between the first gas supply valve and the combustion-gas pressure regulating valve, a height of the blowdown valve being less than a height of the main pipeline.

In any one of the implementations above, the first sub-pipeline may further include: a gas temperature sensor, located on the first gas outlet pipe and configured to detect temperature of combustion-gas in the first gas outlet pipe; and a second pressure sensor, located on the first gas outlet pipe and configured to detect pressure of the combustion-gas in the first gas outlet pipe.

In any one of the implementations above, the combustion-gas supply system may further include: a first gas supply interface, including a first gas delivery pipe being in communication with the first gas intake pipe; a second gas supply interface, including a second gas delivery pipe being in communication with the first gas intake pipe; and a third gas supply interface, including a third gas delivery pipe being in communication with the first gas intake pipe. Both a pipe diameter of the second gas delivery pipe and a pipe diameter of the third gas delivery pipe may be larger than a pipe diameter of the first gas delivery pipe, and both the pipe diameter of the second gas delivery pipe and the pipe diameter of the third gas delivery pipe may be larger than a pipe diameter of the first gas intake pipe.

In any one of the implementations above, both the pipe diameter of the second gas delivery pipe and the pipe diameter of the third gas delivery pipe may be greater than or equal to two times of the pipe diameter of the first gas delivery pipe.

In any one of the implementations above, the second sub-pipeline may further include: a flow control valve, located between the combustion-gas supply valve and the gas supply pipe; and a one-way gas valve. An input end of the one-way gas valve may be connected with the flow control valve, and an output end of the one-way gas valve may be communicated with the gas supply pipe.

In any one of the implementations above, the second sub-pipeline may further include: a gas exhaust valve, located between the combustion-gas supply valve and the one-way gas valve.

At least one embodiment of the present disclosure further provides a device equipped with a turbine engine, which includes: a turbine engine; and the abovementioned combustion-gas supply system. The turbine engine may include a fuel nozzle. The gas supply pipe may be configured to provide combustion-gas to the fuel nozzle.

At least one embodiment of the present disclosure further provides a combustion-gas supply method of the combustion-gas supply system, which includes: before supplying combustion-gas, turning on the second gas supply valve, and introducing first high-pressure gas into the first sub-pipeline through the multi-functional pipeline, to test pressure of the first sub-pipeline; and after operation is completed, turning on the second gas supply valve, and introducing second high-pressure gas into the first sub-pipeline through the multi-functional pipeline, to discharge residual combustion-gas in the first sub-pipeline from the first gas intake pipe.

In the implementation above, the combustion-gas supply method may further include: during operation, when pressure of combustion-gas in the first gas outlet pipe is less than a preset value, turning on the second gas supply valve, and introducing combustion-gas into the first gas outlet pipe through the multi-functional pipeline.

In any one of the implementations above, a plurality of the combustion-gas supply systems are arranged, each of the combustion-gas supply systems further includes: a first gas supply interface including a first gas delivery pipe being in communication with the first gas intake pipe; a second gas supply interface including a second gas delivery pipe being in communication with the first gas intake pipe; and a third gas supply interface including a third gas delivery pipe being in communication with the first gas intake pipe. Both a pipe diameter of the second gas delivery pipe and a pipe diameter of the third gas delivery pipe may be larger than a pipe diameter of the first gas delivery pipe. Both a pipe diameter of the second gas delivery pipe and a pipe diameter of the third gas delivery pipe may be larger than a pipe diameter of the first gas intake pipe. The combustion-gas supply method may further include: connecting the third gas supply interface in one of two adjacent ones of the combustion-gas supply systems with the second gas supply interface in the other one of the two adjacent ones of the combustion-gas supply systems, to connect the plurality of the combustion-gas supply systems in series.

At least one embodiment of the present disclosure further provides a fracturing system, which includes: a first fracturing device group, including N turbine fracturing devices; a second fracturing device group, including M turbine fracturing devices; a combustion-gas pipeline being connected with the first fracturing device group and the second fracturing device group and configured to provide combustion-gas to N+M turbine fracturing devices. The fracturing system may further include a compressed air pipeline connected with the first fracturing device group and the second fracturing device group and configured to provide compressed air to the N+M turbine fracturing devices. The fracturing system may further include an auxiliary-energy pipeline. Each of the turbine fracturing devices may include a turbine engine and an auxiliary device, and the auxiliary-energy pipeline may be connected with the first fracturing device group and the second fracturing device group and configured to provide auxiliary-energy to auxiliary devices of the N+M turbine fracturing devices. N and M are positive integers greater than or equal to 2. Each of the turbine fracturing devices may include a turbine engine and the combustion-gas supply system, the combustion-gas supply system may be connected with the combustion-gas pipeline and configured to provide combustion-gas to the turbine engine.

In the implementation above, the auxiliary device may include a diesel engine. The auxiliary-energy pipeline may be configured to deliver diesel fuel. Alternatively, the auxiliary device may include an electric motor, and the auxiliary-energy pipeline may be configured to deliver electrical power.

In any one of the implementations above, the combustion-gas pipeline may include a main combustion-gas pipeline and a plurality of combustion-gas branch pipelines connected with the main combustion-gas pipeline. The auxiliary-energy pipeline may include an auxiliary-energy main pipeline and a plurality of auxiliary-energy branch pipelines connected with the auxiliary-energy main pipeline. The compressed air pipeline may include a compressed air main pipeline and a plurality of compressed air branch pipelines connected with the compressed air main pipeline. The main combustion-gas pipeline, the main auxiliary-energy pipeline and the main compressed air pipeline may be arranged between the first fracturing device group and the second fracturing device group.

In any one of the implementations above, the fracturing system may further include: a manifold system, located between the first fracturing device group and the second fracturing device group, and configured to transport fracturing fluid. The main combustion-gas pipeline, the main auxiliary-energy pipeline and the main compressed air pipeline may be fixed on the manifold system, and the manifold system may include at least one high and low-pressure manifold skid.

In any one of the implementations above, the combustion-gas pipeline may be configured to connect N+M turbine fracturing devices of the first fracturing device group and the second fracturing device group in series, to provide combustion-gas to the N+M turbine fracturing devices. The compressed air pipeline may also connect the N+M o turbine fracturing devices of the first fracturing device group and the second fracturing device group in series, to provide compressed air to the N+M turbine fracturing devices. The auxiliary-energy pipeline may also connects the N+M turbine fracturing devices of the first fracturing device group and the second fracturing device group in series, to provide auxiliary-energy to the auxiliary devices of the N+M turbine fracturing devices.

In any one of the implementations above, the combustion-gas pipeline may include a first sub combustion-gas pipeline and a second sub combustion-gas pipeline. The first sub combustion-gas pipeline may connect the N turbine fracturing devices of the first fracturing device group in series, to provide combustion-gas to the N turbine fracturing devices. The second sub combustion-gas pipeline connects the M turbine fracturing devices of the second fracturing device group in series, to provide combustion-gas to the M turbine fracturing devices, In any one of the implementations above, the compressed air pipeline may include a first sub compressed air pipeline and a second sub compressed air pipeline. The first sub compressed air pipeline may connect the N turbine fracturing devices of the first fracturing device group in series, to provide compressed air to the N turbine fracturing devices. The second sub compressed air pipeline connects the M turbine fracturing devices of the second fracturing device group in series, to provide compressed air to the M turbine fracturing devices.

In any one of the implementations above, the auxiliary-energy pipeline may include a first sub auxiliary-energy pipeline and a second sub auxiliary-energy pipeline. The first sub-auxiliary-energy pipeline may connect the N turbine fracturing devices of the first fracturing device group in series, to provide auxiliary-energy to the auxiliary devices of the N turbine fracturing devices. The second sub-auxiliary-energy pipeline may connect the M turbine fracturing devices of the second fracturing device group in series, to provide auxiliary-energy to the auxiliary devices of the M turbine fracturing devices.

The present invention will be described in detail below with reference to the accompanying drawings and specific implementations.

DESCRIPTION OF THE EMBODIMENTS

In order to explain the subject matters, technical details and advantages of embodiments of the present disclosure, the technical solutions of the embodiments will be described in a below in connection with the accompanying drawings. The described embodiments are merely examples of the present disclosure. Based on the disclosed embodiments herein, those having ordinary skill in the art can obtain or derive, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which may be direct or indirect.

Figure 1:
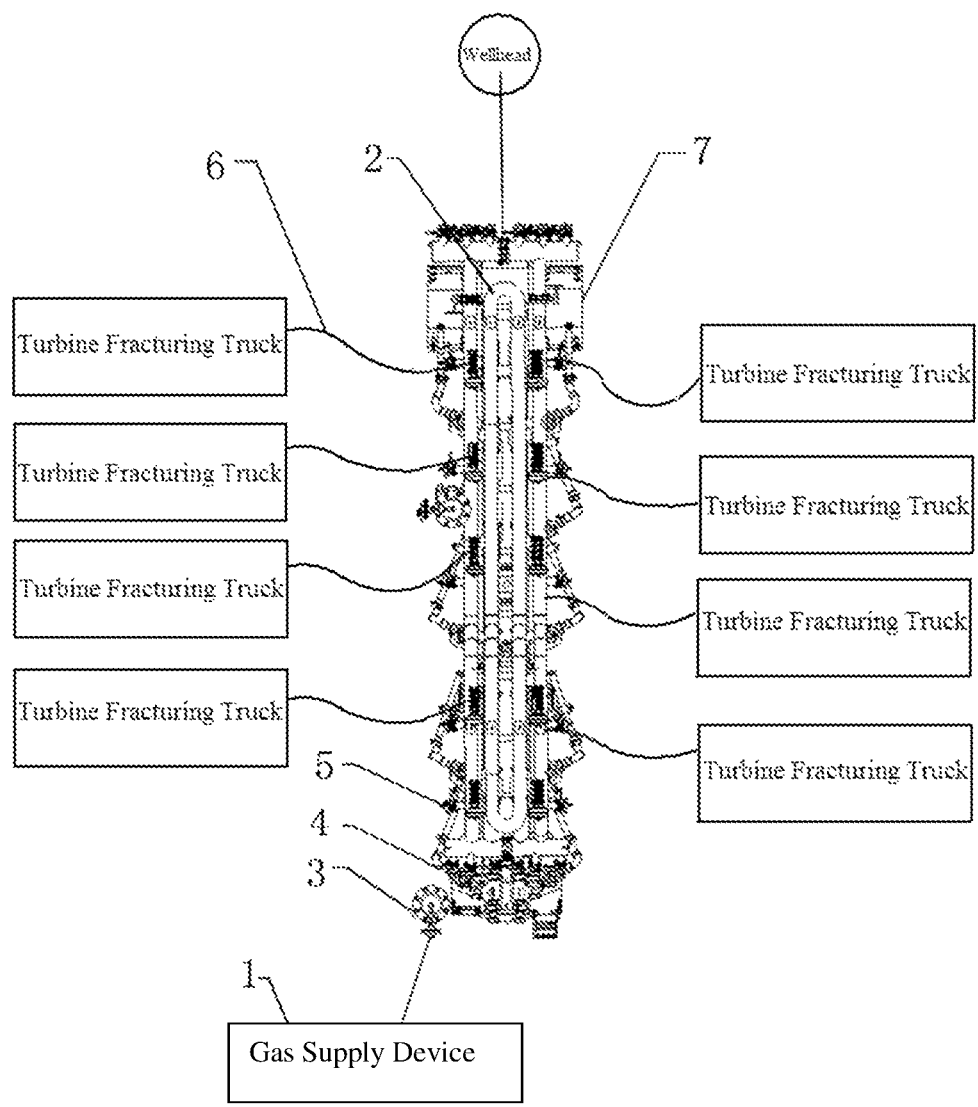
FIG. 1 shows a schematic structural diagram of an example gas source system for supplying gas to a turbine engine by fracturing manifold equipment according to an embodiment of the invention. The term gas, refers to combustion gas fuel supplied to the turbine engine, such as natural gas fuel. The numerical legends are: 1. gas supply device, 2. gas delivery manifold, 3. filtering device, 4. gas detecting system, 5. guard, 6. connecting device, 7. fracturing manifold equipment.

As shown in FIG. 1, an gas source system for supplying gas to a turbine engine by fracturing manifold equipment, including a gas supply device 1, a gas delivery manifold 2, a filtering device 3, a gas detecting system 4, and connecting devices 6, wherein the gas delivery manifold 2, the filtering device 3 and the gas detecting system 4 are integrated on the fracturing manifold equipment 7, the gas supply device 1 is connected to the gas delivery manifold 2 through the filtering device 3, and the gas delivery manifold 2 supplies gas to the turbine engines through the connecting devices 6. At an actual fracturing working site, the fracturing manifold equipment 7 may be located near the wellhead for delivering the fracturing fluid from the fracturing equipment into the wellhead. The engine of the fracturing equipment may be powered by a plunger pump, which pumps the fracturing fluid into the wellhead. At the actual wellsite location, the fracturing equipment components may be also arranged around the fracturing manifold equipment 7. In this technical solution, the engines for the fracturing equipment may be implemented as one or more turbine engines. The gas delivery manifold 2 and the filtering device 3 may be integrated on the manifold equipment at the fracturing site, avoiding on-site wiring of the gas delivery manifold 2, thereby saving installation time, reducing the complexity associated with wellsite installation, enhancing the installation efficiency, and decreasing the floor space of the gas delivery manifold 2 and the filtering device 3. The gas filtering device 3 is disposed at a location away from the high-pressure region at the rear of the turbine fracturing trucks. The gas filtering device 3 is particularly disposed at a fixed location on the fracturing manifold equipment 7, thereby reducing or eliminating the hidden danger/risk associated with placing the filtering device 3 near the high-pressure region of the turbine fracturing trucks.

In some example implementations, the gas source system for supplying gas to one or more turbine engines by the fracturing manifold equipment may include a guard 5. The guard 5 may be integrated on the fracturing manifold equipment 7 and may be used to isolate the gas delivery manifold 2 from the fracturing manifold on the fracturing manifold equipment 7, thereby spatially separating the paths of the combustion gas fuel and high-pressure fracturing fluid and enhancing the safety of the wellsite. In specific implementations, the guard 5 may be implemented as an isolating board.

In some example implementations, the guard 5 may be made from steel.

In some example implementations, the gas detecting system 4 may be implemented as a laser gas detecting system.

In some example implementations, the gas detecting system 4 may be implemented as a pan-and-tilt laser gas detecting system.

For example, a pan-and-tilt laser gas detecting system may include multiple scanning laser gas telemeters. The intelligent pan-and-tilt may be configured to drive the scanning laser gas telemeter to rotate 360° horizontally and 180° vertically, enabling the detection of multi-dimensional space on site in real time. An intelligent adjustment function of the pan-and-tilt laser gas detecting system can be implemented to focus on the key detection areas. A camera may be further configured to capture the surroundings synchronously. Meanwhile, the real-time gas detection data may be transmitted to the background analysis system, realizing early detection, early warning and early handling of hidden dangers, such as gas leaks, thereby greatly improving the safety protection level of the wellsite.

The connecting device 6 may include a connecting pipeline, a valve and a quick-connect interface. The valve may be used for turning on-and-off the gas supply of the connecting pipeline. The quick-connect interface may be used for implementing quick connection/disconnection between the connecting pipeline and the turbine engines. The connecting device 6 may enable more flexible gas supply, in a parallel rather than serial scheme to supply combustion gas to a plurality of turbine engines on a plurality of fracturing trucks in the truck-set such that a decommission, swapping, or removal of one turbine fracturing truck would not affect the gas supply to other turbine fracturing trucks. In such implementations, it is only necessary to shut off the valve and disconnect the quick-connect interface associated with a particular turbine engine among the plurality of turbine engines for decommissioning, swapping, or removing the particular turbine engine and fracturing truck from operation.

Figure 2:
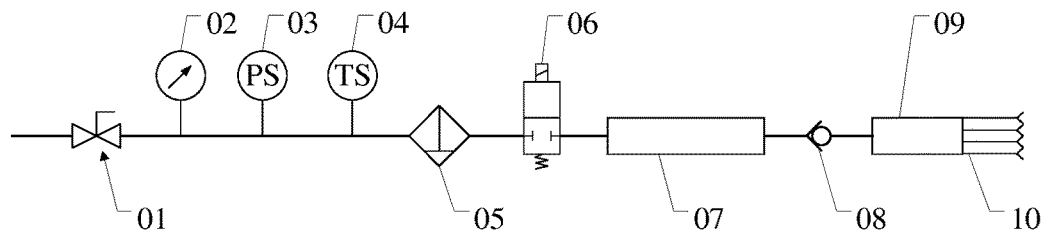
FIG. 2 is a schematic diagram of a combustion-gas supply system of a turbine fracturing vehicle.

Turing to another example combustion gas supply system, FIG. 2 illustrates a schematic diagram of a typical combustion-gas supply path to a turbine engine. As shown in FIG. 2, typical components along the example combustion-gas supply path may include: a gas supply ball valve 01, a gas pressure gauge 02, a gas pressure sensor 03, a gas temperature sensor 04, a gas filter 05, a gas supply solenoid valve 06, a gas flow control valve 07, a turbine engine gas one-way valve 08 that are connected by pipeline(s) and are arranged in sequence. In this way, in a case that the combustion-gas supply system is in operation, combustion gas can enter a corresponding pipeline through the gas supply ball valve 01. The gas pressure sensor 03 and the gas temperature sensor 04 can detect pressure parameters and temperature parameters of the combustion-gas. Subsequently, after filtering out impurities through the gas filter 05, the filtered combustion gas can reach a gas distribution valve block 09 of the turbine engine through the gas supply solenoid valve 06, the gas flow control valve 07, and the turbine engine gas one-way valve 08. The gas distribution valve block 09 may then distribute the gas to various nozzles 10 in a combustion chamber of the turbine engine for combustion.

FIG. 2 thus represents the various example components along the combustion gas path from the source of the combustion gas to the turbine engine on a fracturing vehicle or truck. These components may form a combustion path for a particular turbine engine in FIG. 1. For example, the filter 05 of FIG. 2 may correspond to the filter 3 of FIG. 1. The glass flow control valve 07, and turbine engine gas one-way valve 08, and the gas distribution valve block 09 of FIG. 2 may be part of the connecting device 6 of FIG. 1 for a particular turbine engine.

The typical combustion-gas supply path shown in FIG. 2 can directly process gas fuel directly generated by a fracturing wellhead by arranging the gas filter 05. The processed wellhead gas fuel may be supplied to the turbine engine. Therefore, the combustion-gas supply system can utilize the gas fuel directly generated at a well site, so that a greater economic benefit can be achieved. However, the above-mentioned combustion-gas supply mechanism has the following shortcomings: (1) after the operation is completed, the combustion-gas supply system cannot discharge remaining combustion-gas in the combustion-gas supply system, presenting potential safety hazards; (2) the entire combustion-gas supply path to a turbine engine is provided with only one gas supply interface, and in a case that the gas at the wellhead is insufficient and additional source needs to be added, a pipeline in front of the balloon valve 01 would need to be removed, and then replaced by another pipeline, significantly complicating and slowing down the on-site real-time operation; (3) before and during each fracturing operation, the combustion-gas supply path of FIG. 2 is not provided with separate pressure test interface at different positions in the path; (4) in a case that a plurality of turbine fracturing vehicles are provided at the well site in the form of a vehicle/truck group or vehicle/truck set, the combustion-gas supply systems of the two adjacent fracturing vehicles cannot communicate while such communication maybe desired for more efficient and safer operation.

In this regard, the disclosure below further provides a combustion-gas supply system, a combustion-gas supply method, a device equipped with a turbine engine, and a fracturing system. The combustion-gas supply system for a turbine engine includes a main pipeline and a multi-functional pipeline. The main pipeline may include a first sub-pipeline and a second sub-pipeline that is connected with the first sub-pipeline. The first sub-pipeline may include a first gas intake pipe, a first gas supply valve and a first gas outlet pipe arranged in sequence, the first gas intake pipe being configured to input combustion-gas; the second sub-pipeline including a gas supply valve and a gas supply pipe; and the first gas outlet pipe being connected with the combustion-gas supply valve. The gas supply pipe may be configured to be connected with a turbine engine. The multi-functional pipeline may include a second gas intake pipe, a second gas supply valve and a second gas outlet pipe arranged in sequence, the second gas outlet pipe being communicated with the first gas outlet pipe. In this way, the combustion-gas supply system can introduce high-pressure purging gas (for example, high-pressure air) from the first gas outlet pipe of the first sub-pipeline through the multi-functional pipeline, to discharge residual combustion-gas in the first sub-pipeline, so that safety of the combustion-gas supply system is improved, and complexity and cost of the on-site operation are reduced. In addition, the combustion-gas supply system can also carry out a pressure test on the main pipeline before the operation through the multi-functional pipeline. Safety hazards such as leakage of the main pipeline may be discovered and eliminated in advance. The combustion-gas supply system can further supply combustion-gas through the multi-functional pipeline in a case that the combustion gas supply in the main pipeline is insufficient, so as to facilitate a stable and continuous operation of the entire combustion-gas supply system.

Figure 3:
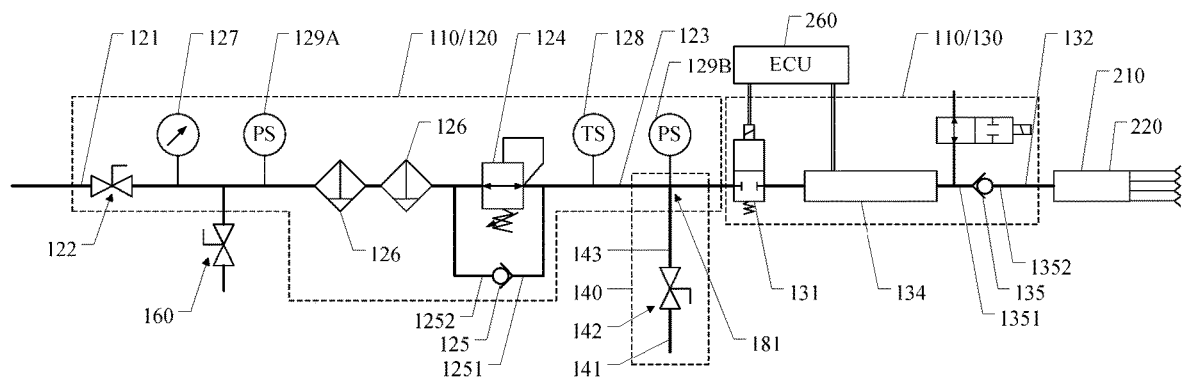
FIG. 3 is a schematic diagram of a combustion-gas supply system provided by an embodiment of the present disclosure.

FIG. 3 shows a schematic diagram of a combustion-gas supply system for a turbine engine provided by an example embodiment of the present disclosure. As shown in FIG. 3, the combustion-gas supply system 100 may include a main pipeline 110. The main pipeline 110 may be configured to supply combustion-gas directly to the turbine engine. The main pipeline 110 may include a first sub-pipeline 120 and a second sub-pipeline 130 that is connected with the first sub-pipeline 120. The first sub-pipeline 120 may include a first gas intake pipe 121, a first gas supply valve 122 and a first gas outlet pipe 123 arranged in sequence. The first gas intake pipe 121 may be configured to input combustion-gas. The second sub-pipeline 130 may include a gas supply valve 131 and a gas supply pipe 132. The first gas outlet pipe 123 may be connected with the combustion-gas supply valve 131, and the gas supply pipe 132 may be configured to connect with the turbine engine.

As shown in FIG. 3, the combustion-gas supply system 100 may further include a multi-functional pipeline 140. The multi-functional pipeline 140 may include a second gas intake pipe 141, a second gas supply valve 142 and a second gas outlet pipe 143 arranged in sequence. The second gas outlet pipe 143 may be in communication with the first gas outlet pipe 123. It should be noted that, in the first sub-pipeline, the second sub-pipeline and the multi-functional pipeline mentioned above, other pipelines, other valves and other functional components may also be inserted between the pipelines, the valves and the functional components which are arranged in sequence, without limitation.

In the combustion-gas supply system provided in the embodiments of the present disclosure, the second gas outlet pipe 143 of the multi-functional pipeline 140 may be in communication with the first gas outlet pipe 123 of the first sub-pipeline 120, which, for example, can be connected through a three-way connection. As such, after one fracturing operation is completed, the second gas supply valve 142 of the multi-functional pipeline 140 can be opened, so that high-pressure purging gas (for example, high pressure air or compressed air) may be introduced into the first gas outlet pipe 123 of the first sub-pipeline 120 through the multi-functional pipeline 140. In this case, because the combustion-gas supply valve 131 has been closed, the high-pressure gas introduced into the first gas outlet pipe 123 can flow to the first gas intake pipe 121. Thus the residual combustion-gas in the first sub-pipeline 120 can be discharged, so as to improve the safety of the combustion-gas supply system 100, and reduce the on-site operation complexity and cost. Under such configuration, before the operation, the combustion-gas supply system 100 can block the first gas intake pipe 121. Then the high-pressure purging gas (for example, high pressure air or compressed air) may be introduced into the first gas outlet pipe 123 of the first sub-pipeline 120 through the multi-functional pipeline 140, so that the pressure test can be performed on the first sub-pipeline 120. Safety hazards such as leakage of the main pipeline can thus be detected and checked in advance. In addition, during the operation, in a case that the gas supply in the main pipeline 110 is insufficient, the combustion-gas supply system 100 can also supply combustion-gas through the multi-functional pipeline 140 to supplement the combustion-gas, so as to facilitate stable and continuous operation of the entire combustion-gas supply system 100 for a turbine.

For example, a pressure of the above-mentioned high-pressure gas may be greater than one standard atmospheric pressure, that is, greater than 0.1 MPa.

For example, the above-mentioned gas may be natural gas, wellhead gas, or other gas that can be combusted by a turbine engine. The purging gas above may be compressed air.

In some examples, as shown in FIG. 3, the first sub-pipeline 120 may further include a combustion-gas pressure regulating valve 124 and a bypass one-way valve 125. The combustion-gas pressure regulating valve 124 may be located between the first gas supply valve 122 and the first gas outlet pipe 123. An input end 1251 of the bypass one-way valve 125 may be communicated with the first gas outlet pipe 123. An output end 1252 of the bypass one-way valve 125 may be located between the combustion-gas pressure regulating valve 124 and the first gas supply valve 122. The bypass one-way valve 125 may be configured to support flow in the direction from the input end 1251 to the output end 1252, and block flow in the direction from the output end 1252 to the input end 1251. With this arrangement, during the fracturing operation, in a case that pressure of the combustion-gas is too high, the combustion-gas pressure regulating valve 124 can regulate the combustion gas, so that pressure of the regulated gas matches a desired gas supply pressure of the turbine engine, and thus the safety of the combustion-gas supply system can be further improved. In a case that high-pressure gas is introduced into the first gas outlet pipe 123 of the first sub-pipeline 120 by using the multi-functional pipe 140 to discharge the residual combustion-gas in the first sub-pipeline 120, because the combustion-gas pressure regulating valve 124 is turned off, the high pressure gas cannot enter the first gas intake pipe 121 from the combustion-gas pressure regulating valve 124, and by arranging the bypass one-way valve 125 in the manner described above, the high-pressure gas can enter the first gas intake pipe 121, so that the residual combustion-gas in the first sub-pipeline 120 can be purged and discharged.

In some example implementations, as shown in FIG. 3, the first sub-pipeline 120 further may include at least one gas filter 126 and a gas source pressure gauge 127. The gas filter 126 may be located between the first gas supply valve 122 and the combustion-gas pressure regulating valve 124. The gas source pressure gauge 127 may be located between the first gas supply valve 122 and the gas filter 126. In this case, the output end 1252 of the bypass one-way valve 125 may be located between the gas filter 126 and the combustion-gas pressure regulating valve 124.

In the combustion-gas supply system provided in this example, the combustion-gas input from the first gas intake pipe 121 may be filtered and processed through at least one gas filter 126, thus the combustion-gas supply system 100 can directly utilize wellhead gas, so that economic benefit can be greatly improved. In addition, due to problems such as unstable pressure and unstable supply of wellhead gas, the combustion-gas supply system 100 provided by the embodiment of the present disclosure can supply combustion-gas to the main pipeline 110 through the above-mentioned multi-functional pipeline 140 in a case that the wellhead gas is insufficient, so that stable and continuous operation of the entire combustion-gas supply system 100 is achieved. For example, the first gas intake pipe 121 may be configured to connect the wellhead gas. The second gas intake pipe 141 of the multi-functional pipeline 140 may be configured to be connected with a natural gas supply device, such as a natural gas storage tank. In addition, the gas source pressure gauge 127 can detect pressure of the combustion-gas input into the first gas intake pipe 121, so as to monitor the input gas. In addition, the gas source pressure gauge 127 can present the pressure of the combustion-gas input in the first gas intake pipe 121 in a visualized manner, to facilitate monitoring by on-site personnel.

Figure 4:
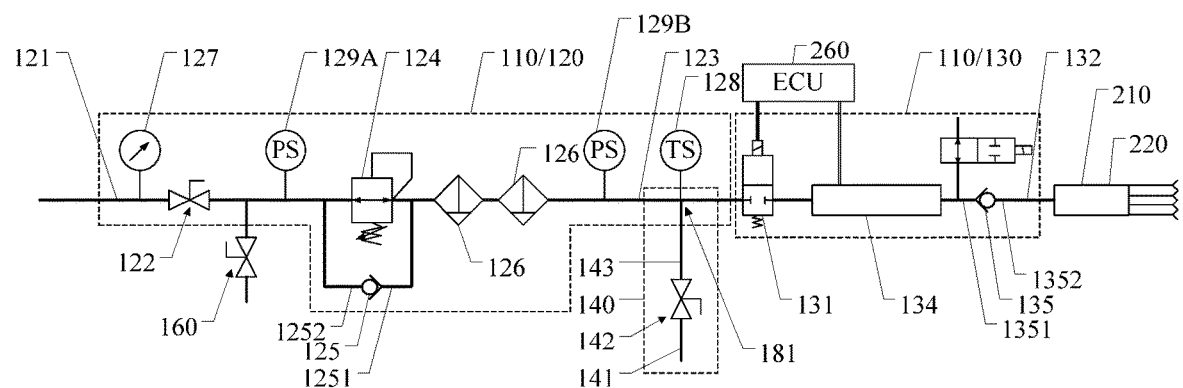
FIG. 4 is a schematic diagram of another combustion-gas supply system provided by an embodiment of the present disclosure.

It should be noted that, although the gas source pressure gauge 127 shown in the example of FIG. 3 is located between the first gas supply valve 122 and the gas filter 126, the arrangement of the gas source pressure gauge 127 in the combustion-gas supply system provided by the embodiment of the present disclosure is not so limited. For example, FIG. 4 shows a schematic diagram of another combustion-gas supply system provided by an embodiment of the present disclosure. As shown in FIG. 4, the gas source pressure gauge 127 can also be arranged between the first gas intake pipe 121 and the first gas supply valve 122.

In some examples, as shown in FIGS. 2 and 3, the first sub-pipeline 120 includes two gas filters 126, so that redundancy of the gas filters 126 can be improved for better filtration and safety=. The number of filters that may be installed in the system above is not limited. Any number of filters may be installed. These filters may be installed in sequence to improve filtration.

In some example implementations, as shown in FIG. 3, the gas filter 126 may be located between the first gas supply valve 122 and the combustion-gas pressure regulating valve 124. However, the embodiments of the present disclosure are not limited thereto. As shown in FIG. 4, the gas filter 126 may also be arranged on a side of the combustion-gas pressure regulating valve 124 away from the first gas supply valve 122, e.g., the input end 1251 of the bypass one-way valve 125. The gas filters 126 may likewise be installed in other locations along the combustion gas path.

In some example implementations, as shown in FIG. 3, the first sub-pipeline 120 may further include a first pressure sensor 129A. The first pressure sensor 129A may be arranged between the first gas supply valve 122 and the gas filter 126, and the first pressure sensor 129A may be configured to monitor supply pressure in real time. For example, the pressure value detected by the first pressure sensor 129A may be sent to a local control terminal or a remote control terminal in a wired manner or a wireless manner.

In some example implementations, as shown in FIG. 3, the combustion-gas supply system 100 may further include a blowdown valve 160. The blowdown valve 160 may be arranged between the first gas supply valve 122 and the combustion-gas pressure regulating valve 124. A height of the blowdown valve 160 may be lower than a height of the main pipeline 110. It should be noted that, the above-mentioned height refers to a height with respect to the horizontal plane. In this manner, the combustion-gas supply system 100 can discharge solid particles or liquid droplets in the main pipeline 110, such as condensed water, through the blowdown valve 160. It should be noted that, for improved discharge of the solid particles or liquid droplets, the height of the blowdown valve 160 may also be lower than a height of a part of the gas delivery pipe where the blowdown valve 160 is located close to the first gas intake pipe 121. It should be noted that, the embodiments of the present disclosure are not limited thereto, and the blowdown valve may also be arranged at other suitable positions.

In some example implementations, the main pipeline 110 and the multi-functional pipeline 140 may be substantially on a same plane (e.g., horizontal plane), and the blowdown valve 160 is not located in that plane. In this way, in a case that the combustion-gas supply system is installed, a height of the blowdown valve 160 can be conveniently arranged to be lower than a height of the main pipeline 110.

In some example implementations, as shown in FIGS. 2 and 3, the first sub-pipeline 120 may further include: a gas temperature sensor 128 and a second pressure sensor 129B. The gas temperature sensor 128 may be located on the first gas outlet pipe 123 and may be configured to detect temperature of the combustion-gas in the first gas outlet pipe 123. The second pressure sensor 129B may be located on the first gas outlet pipe 123 and may be configured to detect pressure of the combustion-gas in the first gas outlet pipe 123. In this way, the gas temperature sensor 128 and the second pressure sensor 129B can detect the temperature and pressure of the combustion-gas in the first gas outlet pipe 123, e.g., the temperature and pressure of the combustion-gas entering the second sub-pipeline 130.

It should be noted that, the embodiment of the present disclosure does not limit an arranging order of the gas temperature sensor 128 and the second pressure sensor 129B. As shown in FIG. 3, the gas temperature sensor 128 may be arranged on a side of the second pressure sensor 129B close to the first gas intake pipe 121. As shown in FIG. 4, the gas temperature sensor 128 may alternatively be arranged on a side of the second pressure sensor 129B away from the first gas intake pipe 121.

In some example implementations, a temperature value detected by the gas temperature sensor 128 and a pressure value detected by the second pressure sensor 129B may be sent to a local control terminal or a remote control terminal in a wired manner or a wireless manner.

In some example implementations, as shown in FIGS. 2 and 3, a connection position of the second gas outlet pipe 143 of the multi-functional pipeline 140 and the first gas outlet pipe 123 of the first sub-pipeline 120 can be arranged with a three-way connection 181. In this case, the gas temperature sensor 128 or the second pressure sensor 129B may be arranged at a position where the three-way connection 181 is located. The embodiments of the present disclosure are not limited thereto. The gas temperature sensor 128 and the gas pressure sensor 129 can also be both arranged on a side of the three-way connection 181 close to the first gas intake pipe 121, or a side of the three-way connection 181 away from the first gas intake pipe 121. The gas temperature sensor 128 and the gas pressure sensor 129 can also be arranged on two sides of the three-way connection 18.

In some example implementations, as shown in FIGS. 2 and 3, the second sub-pipeline 130 may further include a flow control valve 134 and a one-way gas valve 135. The flow control valve 134 may be located between the combustion-gas supply valve 131 and the gas supply pipe 132. An input end 1351 of the one-way gas valve 135 may be connected with the flow control valve 134. An output end 1352 of the one-way gas valve 1352 may be communicated with the gas supply pipe 132. In this way, the flow control valve 134 can control the flow of the gas, and the one-way gas valve can prevent backflow of the gas into the turbine engine.

In some example implementations, as shown in FIGS. 2 and 3, the combustion-gas supply valve 131 and the flow control valve 134 may comprise solenoid valves, and may be electrically or communicatively connected with a control unit 260 (ECU) of the turbine engine. In this way, the opening, the closing, and the opening degree of the combustion-gas supply valve 131 and the flow control valve 134 can be controlled by a control unit 260 (ECU) of the turbine engine. For example, the control unit (ECU) of the turbine engine may determine the opening degree of the flow control valve 134 according to a level of a rotational speed of the turbine engine. It should be noted that, the above-mentioned electrically connection refers to a connection through a signal line, the above-mentioned communicatively connection includes a case of being connected by a signal line, and also includes a case of being connected in a wireless manner (for example, a wireless manner such as Wi-Fi, radio frequency, mobile network, etc.).

In some example implementation, as shown in FIGS. 2 and 3, the gas supply pipe 132 can be connected with a gas distribution valve block 210 of the turbine engine, and the gas distribution valve block 210 may then distribute the gas to various nozzles 220 within a combustion chamber of the turbine engine for combustion.

In some example implementations, as shown in FIGS. 2 and 3, the second sub-pipeline 130 may further include: a gas discharge valve 137, which may be located between the combustion-gas supply valve 131 and the gas one-way valve 135. After one fracturing operation is completed, the gas discharge valve 137 can be used to discharge residual combustion-gas in the second sub-pipeline.

In some example implementations, the first gas supply valve 122, the second gas supply valve 142, and the blowdown valve 160 may be implemented as ball valves. However, the embodiments of the present disclosure are not limited thereto. The first gas supply valve 122, the second gas supply valve 142 and the blowdown valve 160 may also be implemented as other types of valves.

Figure 5:
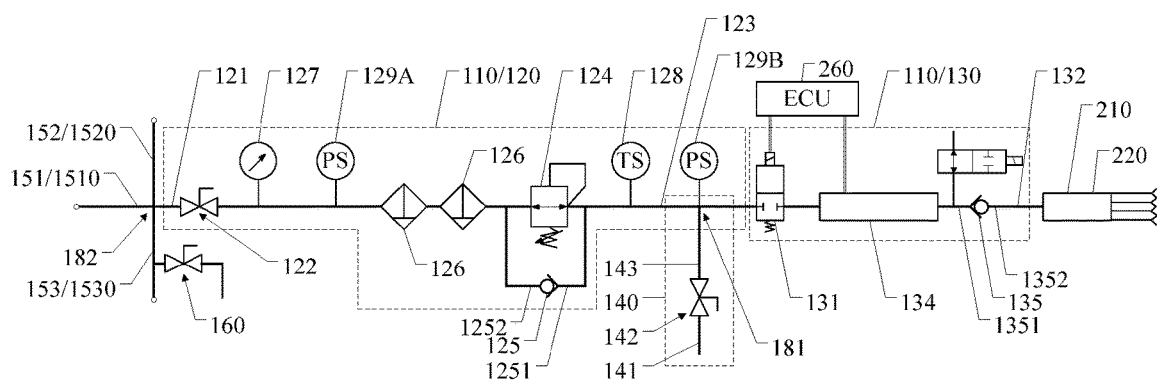
FIG. 5 is a schematic diagram of another combustion-gas supply system provided by an embodiment of the present disclosure.

FIG. 5 is a schematic diagram of another combustion-gas supply system provided by an embodiment of the present disclosure. As shown in FIG. 5, the combustion-gas supply system 100 may further include a main pipeline 110 and a multi-functional pipeline 140. The main pipeline 110 may be used to supply combustion-gas directly to the turbine engine. The main pipeline 110 may include a first sub-pipeline 120 and a second sub-pipeline 130 connected with the first sub-pipeline 120. The first sub-pipeline 120 may include a first gas intake pipe 121, a first gas supply valve 122 and a first gas outlet pipe 123 arranged in sequence. The first gas intake pipe 121 may be configured to input gas. The second sub-pipeline 130 may include a gas supply valve 131 and a gas supply pipe 132. The first gas outlet pipe 123 may be connected with the combustion-gas supply valve 131. The gas supply pipe 132 may be configured to connect with the turbine engine. The multi-functional pipeline 140 may include a second gas intake pipe 141, a second gas supply valve 142 and a second gas outlet pipe 143 being arranged in sequence. The second gas outlet pipe 143 may be communicated with the first gas outlet pipe 123.

As shown in FIG. 5, the combustion-gas supply system 100 may further include: a first gas supply interface 151, a second gas supply interface 152 and a third gas supply interface 153. The first gas supply interface 151 may include a first gas delivery pipe 1510, the first gas delivery pipe 1510 may be communicated with the first gas intake pipe 121. The second gas supply interface 152 may include a second gas delivery pipe 1520. The second gas delivery pipe 1520 is communicated with the first gas intake pipe 121. The third gas supply interface 153 may include a third gas delivery pipe 1530. The third gas delivery pipe 1530 may be communicated with the first gas intake pipe 121. Pipe diameters of the second gas delivery pipe 1520 and the third gas delivery pipe 1530 may be larger than a pipe diameter of the first gas delivery pipe 1510. The pipe diameters of the second gas delivery pipe 1520 and the third gas delivery pipe 1530 maybe larger than a pipe diameter of the first gas intake pipe 121. In this manner, in the combustion-gas supply system 100, the first gas supply interface 151, the second gas supply interface 152 and the third gas supply interface 153 can all be used to supply combustion-gas to the first gas intake pipe 121. When an air supply volume or a gas supply pressure of any one of the first gas supply interface 151, the second gas supply interface 152 and the third gas supply interface 153 is insufficient, gas can be quickly supplied to the first gas intake pipe 121 through the other two gas supply interfaces. In addition, because the pipe diameters of the second gas delivery pipe 1520 and the third gas delivery pipe 1530 are larger than the pipe diameter of the first gas delivery pipe 1510, a plurality of combustion-gas supply systems 100 can achieve a serial operation by connecting the third gas supply interface 153 of one of two adjacent combustion-gas supply systems 100 with the second gas supply interface 152 of the other of the two adjacent combustion-gas supply systems 100.

For example, both the pipe diameter of the second gas delivery pipe 1520 and the pipe diameter of the third gas delivery pipe 1530 may be greater than or equal to two times of the pipe diameter of the first gas delivery pipe 1510. For example, in a case that the diameter of the first gas delivery pipe 1510 is 2 inches, the diameters of the second gas delivery pipe 1520 and the third gas delivery pipe 1530 may be greater than or equal to 4 inches.

For example, as shown in FIG. 5, the first gas delivery pipe 1510, the second gas delivery pipe 1520 and the third gas delivery pipe 1530 may be connected with the first gas intake pipe 121 through a four-way connection 182.

In some example implementations, as shown in FIG. 5, the combustion-gas supply system 100 may further include a blowdown valve 160, the blowdown valve 160 may be located on at least one of the first gas delivery pipe 1510, the second gas delivery pipe 1520 and the third gas delivery pipe 1530. A height of the blowdown valve 160 may be lower than a height of the main pipeline 110. In this way, the combustion-gas supply system 100 can discharge the solid particles and liquid droplets in the main pipeline 110, such as condensed water, through the blowdown valve 160. It should be noted that, in order to better discharge s solid particles and liquid droplets, the height of the blowdown valve 160 may also be smaller than the height of a part of the gas delivery pipe where the blowdown valve 160 is located close to the first gas intake pipe 121.

For example, the main pipeline 110 and the multi-functional pipeline 140 may be substantially in a same plane (e.g., a same horizontal plane), and the blowdown valve 160 may not be located in the same plane. In this way, in a case that the combustion-gas supply system is installed, the height of the blowdown valve 160 can be conveniently arranged to be less than the height of the main pipeline 110.

For example, as shown in FIG. 5, the blowdown valve 160 is located on the third gas delivery pipe 1530. The embodiments of the present disclosure not limited thereto, and the blowdown valve can also be located on the first gas delivery pipe or the second gas delivery pipe.

Other embodiments of the present disclosure further provide a combustion-gas supply method of a combustion-gas supply system, the combustion-gas supply system may be a combustion-gas supply system provided by any of the above examples. The combustion-gas supply method may include: before supplying combustion-gas, opening the second gas supply valve, and introducing a first high-pressure gas into the first sub-pipeline through the multi-functional pipeline, to test pressure of the first sub-pipeline. After the operation is completed, opening the second gas supply valve, and introducing a second high-pressure gas into the first sub-pipeline through the multi-functional pipeline, to discharge residual combustion-gas in the first sub-pipeline from the first gas intake pipe.

In the combustion-gas supply method provided by the embodiments of the present disclosure, before the operation, the first high-pressure gas (for example, high-pressure air) can be introduced into the first gas outlet pipe of the first sub-pipeline through the multi-functional pipeline, so that a pressure test can be performed on the first sub-pipeline, and safety hazards such as leakage of the main pipeline can be discovered and detected in advance. After the operation, the second high-pressure gas can be introduced through the multi-functional pipeline, to discharge the residual combustion-gas in the first sub-pipeline, so that the safety of the combustion-gas supply system is improved, and the complexity and cost of on-site operation are reduced.

It should be noted that, the above-mentioned first high-pressure gas and second high-pressure gas may be a same type of gas, or may be different types of gas. In addition, pressures of the first high-pressure gas and the second high-pressure gas may be the same or different from each other, as long as the pressures are greater than, for example, a threshold of 0.1 Mpa. In order to simplify the whole system and reduce the cost, the first high-pressure gas and the second high-pressure gas can both be compressed air.

In some example implementations, the combustion-gas supply method may further include: during operation, in a case that pressure of combustion-gas in the first gas outlet pipe is less than a preset value, opening the second gas supply valve, and introducing combustion-gas into the first gas outlet pipe through the multi-functional pipeline, so that the stable and continuous operation of the entire combustion-gas supply system is achieved. In particular, in a case that the combustion-gas supply system uses wellhead gas as the combustion gas, due to the problems that the pressure and supply of the wellhead gas may be unstable, the combustion-gas supply method can supply combustion-gas to the main pipeline through the above-mentioned multi-functional pipeline in a case that the wellhead gas is insufficient, so that the stable and continuous operation of the entire combustion-gas supply system is achieved.

For example, the pressure of combustion-gas in the first gas outlet pipe can be detected by the second pressure sensor, then it is determined whether the pressure of combustion-gas is less than a preset value.

In some example implementations, the combustion-gas supply method may further include connecting the first gas intake pipe to the wellhead gas, and connecting the second gas intake pipe of the multi-functional pipeline to the natural gas supply device, such as a natural gas storage tank.

In some example implementations, a plurality of combustion-gas supply systems can be arranged. Referring to FIG. 5, the combustion-gas supply system 100 may further include: a first gas supply interface 151, a second gas supply interface 152 and a third gas supply interface 153. The first gas supply interface 151 may include a first gas delivery pipe 1510, and the first gas delivery pipe 1510 may be communicated with the first gas intake pipe 121. The second gas supply interface 152 may include a second gas delivery pipe 1520, and the second gas delivery pipe 1520 may be communicated with the first gas intake pipe 121. The third gas supply interface 153 may include a third gas delivery pipe 1530, and the third gas delivery pipe 1530 may be communicated with the first gas intake pipe 121. Both a pipe diameter of the second gas delivery pipe 1520 and a pipe diameter of the third gas delivery pipe 1530 may be larger than a pipe diameter of the first gas delivery pipe 1510. Both the pipe diameter of the second gas delivery pipe 1520 and the pipe diameter of the third gas delivery pipe 1530 may be larger than a pipe diameter of the first gas intake pipe 121. In this case, the combustion-gas supply method may further include: connecting a third gas supply interface in one of two adjacent combustion-gas supply systems with a second gas supply interface in the other one of the two combustion-gas supply systems, to connect the plurality of combustion-gas supply systems in series.

In some examples, the combustion-gas supply system may further include: a blowdown valve (which is located on at least one of the first gas delivery pipe,), the second gas delivery pipe and the third gas delivery pipe. A height of the blowdown valve may be lower than the height of the main pipeline. The combustion-gas supply method may further include: opening the blowdown valve to discharge sundries in the main pipeline.

Hereinafter, the combustion-gas supply method will be specifically described by taking the combustion-gas supply system shown in FIG. 5 as an example. It is worth noting that, the combustion-gas supply method provided by the embodiments of the present disclosure is not limited to the following specific execution steps.

In some examples, in a case that the combustion-gas supply system adopts the combustion-gas supply system shown in FIG. 5, the combustion-gas supply method may include: before the operation, connecting the second gas intake pipe 1411 of the multi-functional pipeline 140 to a pressure test pipeline; blocking the first gas supply interface 151, the second gas supply interface 152 and the third gas supply interface 153 with plugs; closing the blowdown valve 160; opening the first gas supply valve 122; and ensuring that the combustion-gas supply valve 131 is in a closed state; then opening the second gas supply valve 142, and introducing high-pressure gas into the first sub-pipeline 120 through the multi-functional pipeline 140, so that a pressure test is performed on the first sub-pipeline 120, and safety hazards such as leakage of the main pipeline are discharged in advance.

In some example implementations, in a case that the combustion-gas supply system adopts the combustion-gas supply system shown in FIG. 5, the combustion-gas supply method may include: during operation, connecting one of the first gas supply interface 151, the second gas supply interface 152 and the third gas supply interface 153 with a combustion-gas source; blocking the other two gas supply interfaces with plugs, then adjusting the gas source pressure to a gas supply pressure (typically 250 psi) that may be required by the turbine engine through the combustion-gas pressure regulating valve 124, and starting the turbine engine for operation in a case that everything is ready.

In some example implementations, in a case that the combustion-gas supply system adopts the combustion-gas supply system shown in FIG. 5, the combustion-gas supply method may include: during operation, if the gas source (such as the wellhead gas) is insufficient, the gas pressure sensor 129 may detect that the gas supply pressure is low, and the method may further include connecting the second gas intake pipe 141 with a backup gas source (for example, a natural gas storage tank), opening the second gas supply valve 142, thus backup gas enters the first sub-pipeline 120 through the multi-functional pipeline 140. As such, the backup gas source can supplement the gas supply of the turbine engine.

In some example implementations, in a case that the combustion-gas supply system shown in FIG. 5 is implemented, the combustion-gas supply method may include: after the operation is completed, ensuring that the second gas supply valve 142 is in a closed state; connecting the second gas intake pipe 141 with a compressed air source; and connecting one of the first gas supply interface 151, the second gas supply interface 152 and the third gas supply interface 153 with a special container for collecting gas; after the connection is completed, opening the second gas supply valve 142, thus the high-pressure gas enters the first sub-pipeline 120 through the multi-functional pipeline 140, so that the gas remaining in the first sub-pipeline 120 in this case is replaced, and is discharged from the first gas supply interface 151.

In some example implementations, in a case that the combustion-gas supply system shown in FIG. 5 is implemented, the combustion-gas supply method may include: after the remaining combustion-gas in the first sub-pipeline 120 is replaced, opening the blowdown valve 160 to remove the sundries in the first sub-pipeline 120, such as condensed water.

Figure 6:
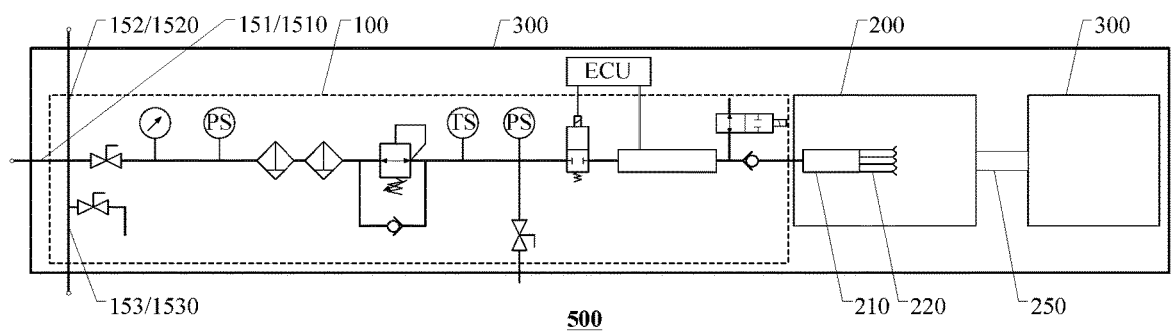
FIG. 6 is a schematic diagram of a device equipped with a turbine engine provided by an embodiment of the present disclosure.

Other example embodiments of the present disclosure further provides a system equipped with a turbine engine. FIG. 6 is a schematic diagram of a system equipped with a turbine engine provided by an embodiment of the present disclosure. As shown in FIG. 6, the system 500 may include a turbine engine 200 and a combustion-gas supply system 100. The combustion-gas supply system 100 may be a combustion-gas supply system provided by any one of the above examples. The turbine engine 200 includes a fuel nozzle 220, and the gas supply pipe 132 is configured to provide fuel gas to the fuel nozzle 220.

In some examples, as shown in FIG. 6, the system 500 further includes: a plunger pump 300, which is connected with an output shaft 250 of the turbine engine 200, and is configured to pressurize liquid using the power output by the turbine engine 200. For example, the plunger pump 300 may pressurize fracturing fluid, then the pressurized fracturing fluid can be injected into the wellhead for fracturing operation.

In some examples, as shown in FIG. 6, the system 500 can be a mobile fracturing device, which includes a vehicle 510. In this case, the fuel combustion-gas supply system 100 may further include a first gas supply interface 151, a second gas supply interface 152 and a third gas supply interface 153. The first gas supply interface 151 may include a first gas delivery pipe 1510, which is connected with the first gas intake pipe 121. The second gas supply interface 152 may include a second gas delivery pipe 1520, which may be connected with the first gas intake pipe 121. The third gas supply interface 153 may include a third gas delivery pipe 1530, which is connected with the first gas intake pipe 121. Both a pipe diameter of the second gas delivery pipe 1520 and a pipe diameter of the third gas delivery pipe 1530 may be larger than a pipe diameter of the first gas delivery pipe 1510. The pipe diameter of the second gas delivery pipe 1520 and the pipe diameter of the third gas delivery pipe 1530 may be larger than a pipe diameter of the first gas intake pipe 121.

As further shown in FIG. 6, the second gas supply interface 152 and the third gas supply interface 153 may be located on two sides of the vehicle 510. In this manner, in a case that a plurality of mobile fracturing devices are operated in a group, because the second gas supply interface 152 and the third gas supply interface 153 are located on two sides of the vehicle 510, it may become convenient to connect a plurality of combustion-gas supply systems 100 in series, thus the pipeline on-site is simplified. It should be noted that, the two sides of the above vehicle refer to opposite sides in a direction perpendicular to an extension direction of a girder of the vehicle, or opposite sides in a direction perpendicular to an extension direction of the main pipeline of the combustion-gas supply system.

Figure 7:
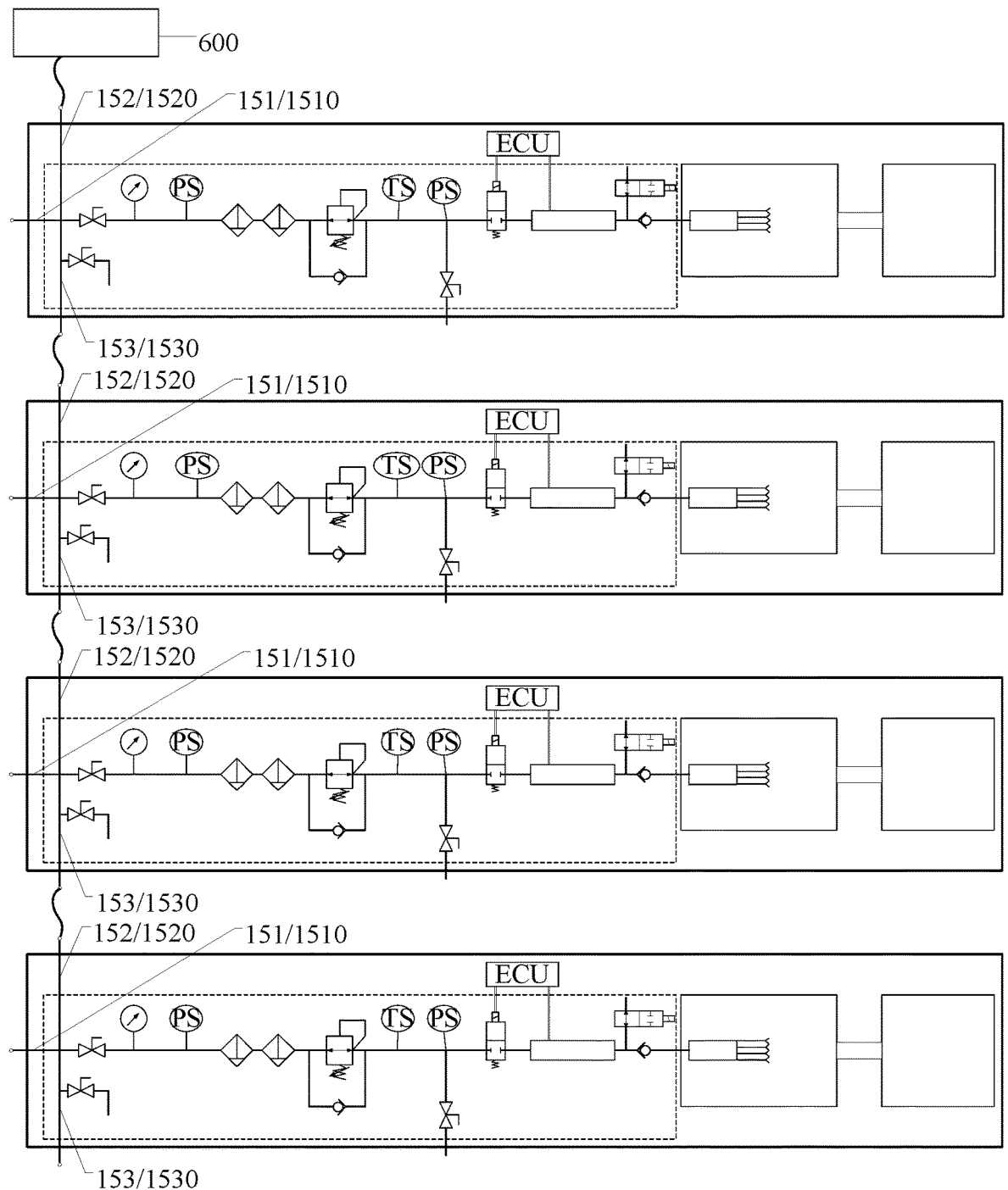
FIG. 7 is a schematic diagram of another device equipped with a turbine engine working in groups provided by an embodiment of the present disclosure.

FIG. 7 illustrates a schematic diagram of a device equipped with turbine engines operating in groups provided by an embodiment of the present disclosure. As shown in FIG. 7, the system 500 equipped with a turbine engine can be a turbine fracturing vehicle. As an example, four turbine fracturing vehicles in 500 are shown as arranged in turn and form a vehicle group. A second gas supply interface 152 of a turbine fracturing vehicle 500 (for example, the first turbine fracturing vehicle) in the vehicle group nearest to a gas source 600 (for example, a wellhead) is connected with the gas source. A third gas supply interface 153 of the turbine fracturing vehicle 500 closest to the gas source (for example, the wellhead) in the vehicle group is connected with a second gas supply interface 152 of an adjacent turbine fracturing vehicle 500 (for example, a second turbine fracturing vehicle). A third gas supply interface 153 of a second turbine fracturing vehicle 500 is connected with the second gas supply interface 152 of an adjacent turbine fracturing vehicle 500 (for example, a third turbine fracturing vehicle). A third gas supply interface 153 of the third turbine fracturing vehicle 500 is connected with a second gas supply interface 152 of an adjacent turbine fracturing vehicle 500 (for example, a fourth turbine fracturing vehicle). In this way, the four turbine fracturing vehicles 500 are configured to form parallel operation with respect to combustion gas supply.

Figure 8:
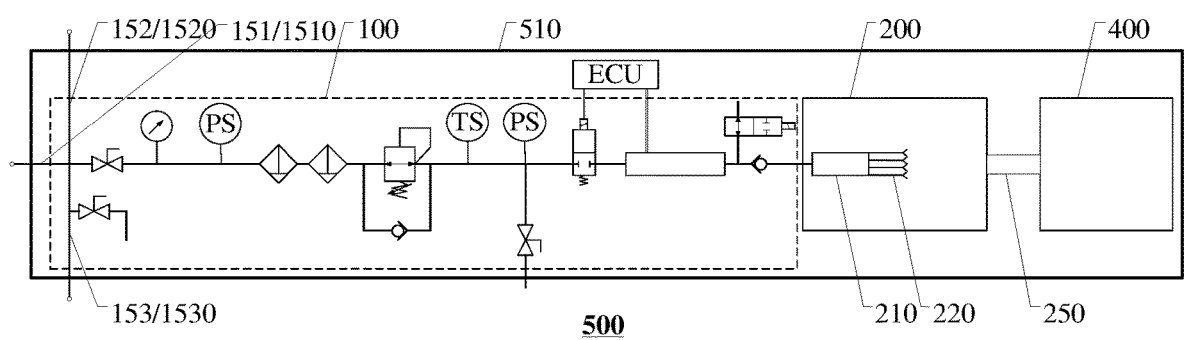
FIG. 8 is a schematic diagram of another device equipped with a turbine engine provided by an embodiment of the present disclosure.

FIG. 8 shows a schematic diagram of another system equipped with a turbine engine provided by an embodiment of the present disclosure. As shown in FIG. 8, in addition to other components, the system 500 may further include a power generator 400, which may be connected with an output shaft 250 of the turbine engine 200, and may be configured to use power output by the turbine engine 200 to generate electricity.

In fracturing operations, in order to provide greater displacement of fracturing fluid and achieve higher efficiency, a plurality of fracturing devices or systems may be grouped for operation. The fracturing devices themselves need to intake low-pressure fracturing fluid, and discharge high-pressure fracturing fluid. Thus, various liquid pipelines are needed for transportation of the fracturing fluid. Each of the fracturing devices further requires substances and energy such as fuel (such as natural gas), compressed air, and auxiliary-energy (such as electricity, diesel, etc.). These substances and energy also need pipelines or cables to transport or deliver. In this case, the pipelines needed for a plurality of fracturing devices grouped together may become very complicated, and high-pressure fluid, fuel, compressed air and auxiliary-energy are also dangerous to the system components and then personnel. As such, a safe, efficient and clean pipeline system is needed in order to provide safe operation and to enable convenient safety management and device maintenance.

Figure 9:
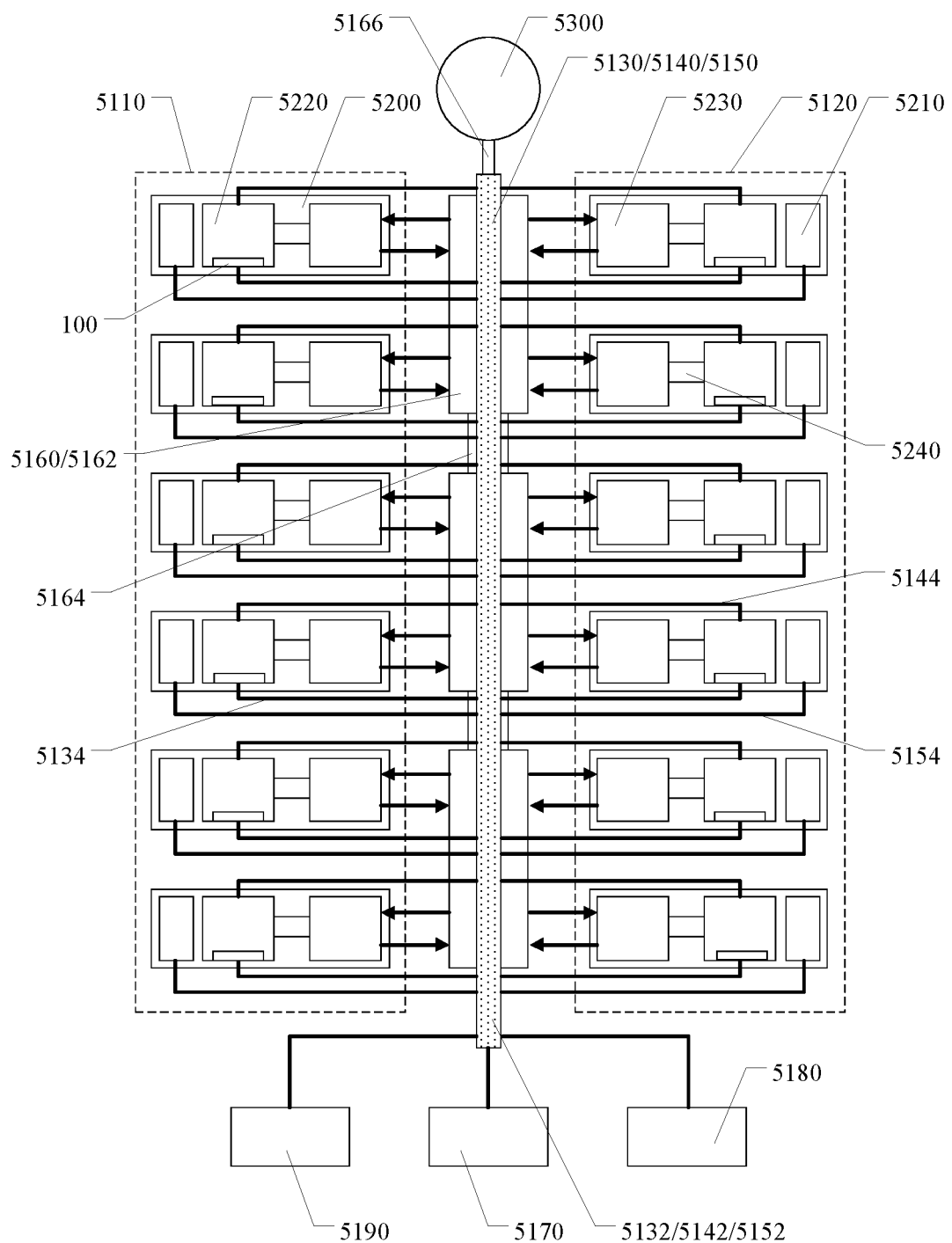
FIG. 9 is a schematic diagram of a fracturing system provided by an embodiment of the present disclosure.

An embodiment of the present disclosure further provides an example fracturing system in this regard. FIG. 9 shows a schematic diagram of a fracturing system provided by an example embodiment of the present disclosure.

As shown in FIG. 9, the fracturing system 5100 may include a first fracturing device group 5110, a second fracturing device group 5120, a combustion-gas pipeline 5130, a compressed air pipeline 5140 and an auxiliary-energy pipeline 5150. The first fracturing device group 5110 may include N turbine fracturing devices 5200. The second fracturing device group 5120 may include M turbine fracturing devices 5200. The combustion-gas pipeline 5130 may be connected with the first fracturing device group 5110 and the second fracturing device group 5120, and may be configured to supply combustion-gas to the N+M turbine fracturing devices 5200. The compressed air pipeline 5140 may be connected with the first fracturing device group 5110 and the second fracturing device group 5120, and may be configured to provide compressed air to the N+M turbine fracturing devices 5200. Each of the turbine fracturing devices 5200 may include a turbine engine 5220 and auxiliary device 5210. The auxiliary-energy pipeline 5150 may be connected with the first fracturing device group 5110 and the second fracturing device group 5120, and may be configured to provide auxiliary-energy to the auxiliary devices 210 of the N+M turbine fracturing devices 200, N and M being positive integers greater than or equal to 2.

In the fracturing system provided by the above embodiment of the present disclosure, the fracturing system may include a first fracturing device group and a second fracturing device group. The first fracturing device group may include N turbine fracturing devices. The second fracturing device group may include M turbine fracturing devices. In such a manner, the fracturing system can utilize a plurality of turbine fracturing devices grouped for fracturing operations, so that displacement of the fracturing fluid and operational efficiency can be improved. The fracturing system may further integrate the combustion-gas pipeline, compressed air pipeline and auxiliary-energy pipeline of the plurality of turbine fracturing devices, so that it is convenient to carry out safer operation and enable convenient safety management and device maintenance.

In some example implementations, each of the turbine fracturing devices 5200 mentioned above may include a turbine engine and a combustion-gas supply system 100 described in any one of the above combustion-gas supply systems. The combustion-gas supply system 100 may be connected with the combustion-gas pipeline 5130, and may be configured to provide combustion-gas to the turbine engine.

In some example implementations, as shown in FIG. 9, the values of M and N may be equal, for example, both are 6. However, the embodiments of the present disclosure are not limited thereto. The values of M and N may also be unequal and may also be chose as other integer numbers.

In some example implementations, as shown in FIG. 9, the auxiliary device 5210 of each of the turbine fracturing devices 5200 may include a diesel engine. The auxiliary-energy pipeline 5150 may be configured to deliver diesel fuel.

In some example implementations, the auxiliary device may further include an oil pump, a hydraulic system, and a hydraulic motor. The diesel engine can drive the oil pump, thereby driving the hydraulic system. The hydraulic system may be configured to drive the hydraulic motor to complete various auxiliary tasks, such as, starting the turbine engine, driving a radiator to work, and the like. However, the embodiments of the present disclosure are not limited thereto. The auxiliary device may further include a lubricating system and a lubricating oil pump. The diesel engine can drive the lubricating oil pump, thereby driving the lubricating system to in operation.

In some example implementations, as shown in FIG. 9, the auxiliary device 5210 of each of the turbine fracturing devices 5200 may include an electric motor, and the auxiliary-energy pipeline 5150 may be configured to deliver electrical power.

In some example implementations, the auxiliary device may further include an oil pump, a hydraulic system, and a hydraulic motor. The electric motor can drive the oil pump, thereby driving the hydraulic system. The hydraulic system may drive the hydraulic motor to complete various auxiliary tasks, such as starting the turbine engine, driving the radiator, and the like. The embodiments of the present disclosure are not limited thereto. The auxiliary device may also include a lubricating system and a lubricating oil pump. The electric motor may be configured to drive the lubricating oil pump, thereby achieving sufficient lubrication of various component of the fracturing system.

In some example implementations, as shown in FIG. 9, each of the turbine fracturing devices 5200 may include a turbine engine 5220, a fracturing pump 5230 and a transmission mechanism 5240. The turbine engine 5220 may be connected with the fracturing pump 230 through the transmission mechanism 5240.

In some example implementations, as shown in FIG. 9, the combustion-gas pipeline 5130 may be configured to provide fuel, such as natural gas, to the turbine engine 5220 of each of the turbine fracturing devices 5200.

In some example implementations, as shown in FIG. 9, the compressed air pipeline 5140 may be configured to provide compressed air to the turbine engine 5220 of each of the turbine fracturing devices 5200.

In some example implementations, as shown in FIG. 9, the combustion-gas pipeline 5130 may include a main combustion-gas pipeline 5132 and a plurality of combustion-gas branch pipelines 5134 that are connected with the main combustion-gas pipeline 5132. The compressed air pipeline 5140 may include a compressed air main pipeline 5142 and a plurality of compressed air branch pipelines 5144 that are connected with the compressed air main pipeline 5142. The auxiliary-energy pipeline 5150 may include an auxiliary-energy main pipeline 5152 and a plurality of auxiliary-energy branch pipelines 5154 that are connected with the auxiliary-energy main pipeline 5152. The main combustion-gas pipeline 5132, the auxiliary-energy main pipeline 5152 and the compressed air main pipeline 5142 may be arranged between the first fracturing device group 5110 and the second fracturing device group 5120, so as to improve operation safety and felicitate safety management and device maintenance of the combustion-gas pipeline, the auxiliary-energy pipeline and the compressed air pipeline.

In some example implementations, as shown in FIG. 9, the plurality of gas branch pipelines 5134 of the combustion-gas pipeline 5130 may be connected with the N+M turbine fracturing devices 5200 of the first fracturing device group 5110 and the second fracturing device group 5120 located on two sides of the main combustion-gas pipeline 5132, and to provide combustion-gas for the N+M turbine fracturing devices 5200.

In some example implementations, as shown in FIG. 9, the plurality of compressed air branch pipelines 5144 of the compressed air pipeline 5140 may be connected with the N+M turbine fracturing devices 5200 of the first fracturing device group 5110 and the second fracturing device group 5120 located on two sides of the compressed air main pipeline 5142, and to provide compressed air for the N+M turbine fracturing devices 5200.

In some example implementations, as shown in FIG. 9, the plurality of auxiliary-energy branch pipelines 5154 of the auxiliary-energy pipeline 5150 may be connected with the N+M turbine fracturing devices 5200 of the first fracturing device group 5110 and the second fracturing device group 5120 located on two sides of the auxiliary-energy main pipeline 5152, and to provide auxiliary-energy for the N+M turbine fracturing devices 5200.

In some example implementations, as shown in FIG. 9, the fracturing system 5100 may further include a manifold system 5160. The manifold system 5160 may be located between the first fracturing device group 5110 and the second fracturing device group 5120, and may be configured to deliver fracturing fluid. In this case, the main combustion-gas pipeline 5132, the main auxiliary-energy pipeline 5152 and the main compressed air pipeline 5142 may be fixed on the manifold system 5160. In this way, the fracturing system integrates the manifold system for conveying fracturing fluid with combustion-gas pipeline, compressed air pipeline and auxiliary-energy pipeline, which can further facilitate safety management and device maintenance.

In some example implementations, as shown in FIG. 9, the manifold system 5160 may include at least one high and low-pressure manifold skid 5162. Each of the high and low-pressure manifold skids 5162 may be connected with at least one of the turbine fracturing devices 5200, and may be configured to deliver low pressure fracturing fluid to the at least one of the turbine fracturing devices 5200, and to collect high-pressure fracturing fluid output by the turbine fracturing device.

For example, as shown in FIG. 9, each of the high and low-pressure manifold skids 5162 may be connected with four turbine fracturing devices 5200. The embodiments of the present disclosure, however, are not limited thereto. The number of the turbine fracturing devices connected with each of the high and low-pressure manifold skids can be arranged according to actual situations.

In some example implementations, as shown in FIG. 9, the manifold system 5160 may include a plurality of high and low-pressure manifold skids 5162. The plurality of high and low-pressure manifold skids 5162 may be connected through a first high pressure pipe 5164.

For example, the first high pressure pipe can be a rigid pipe or a flexible pipe, which is not specifically limited in the embodiments of the present disclosure.

In some example implementations, as shown in FIG. 9, the manifold system 5160 may further include a second high-pressure pipe 5166. The second high-pressure pipe 5166 may be communicated with a fracturing wellhead 5300.

For example, the second high-pressure pipe may be a rigid pipe or a flexible pipe, which is not specifically limited in the embodiment of the present disclosure.

In some example implementations, as shown in FIG. 9, the fracturing device 5100 may further include a gas supply device 5170, a compressed air supply device 5180 and an auxiliary-energy supply device 5190. The gas supply device 5170 may be connected with the combustion-gas pipeline 5130. The compressed air supply device 5180 may be connected with the compressed air pipeline 5140. The auxiliary-energy supply device 5190 may be connected with the auxiliary-energy pipeline 5150.

Figure 10:
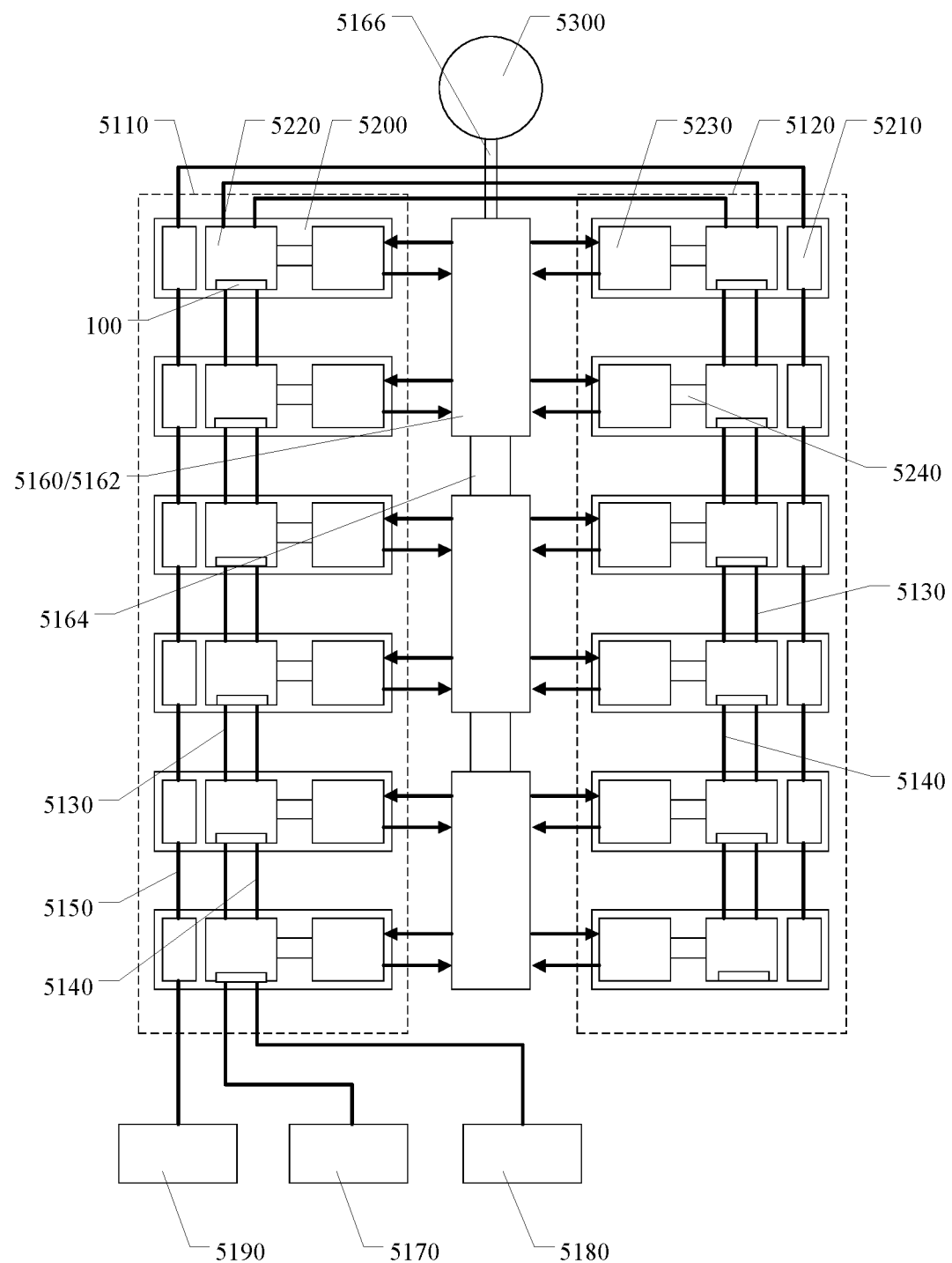
FIG. 10 is a schematic diagram of another fracturing system provided by an embodiment of the present disclosure.

FIG. 10 shows a schematic diagram of another fracturing system provided by an embodiment of the present disclosure. As shown in FIG. 10, the combustion-gas pipeline 5130 connects the N+M turbine fracturing devices 5200 of the first fracturing device group 5110 and the second fracturing device group 5120 in series, to provide fuel gas to the N+M turbine fracturing devices 5200. In this way, the fracturing device can connect the N+M turbine fracturing devices of the first fracturing device group and the second fracturing device group in series through the combustion-gas pipeline, so as to facilitate safety management and device maintenance of the combustion-gas pipeline of the fracturing system.

In some example implementations, as shown in FIG. 10, the compressed air pipeline 5140 connects the N+M turbine fracturing devices 5200 of the first fracturing device group 5110 and the second fracturing device group 5120 in series, to provide compressed air to the N+M turbine fracturing devices 5200. In this way, the fracturing device can connect the N+M turbine fracturing devices of the first fracturing device group and the second fracturing device group in series through the compressed air pipeline, so as to facilitate safety management and device maintenance of the compressed air pipeline of the fracturing system.

In some examples, as shown in FIG. 10, the auxiliary-energy pipeline 5150 may be configured to connect the N+M turbine fracturing devices 5200 of the first fracturing device group 5110 and the second fracturing device group 5120 in series, to provide auxiliary-energy to the auxiliary devices 5210 of the N+M turbine fracturing devices 5200. In this way, the fracturing device can connect the N+M turbine fracturing devices of the first fracturing device group and the second fracturing device group in series through the auxiliary-energy pipeline, so as to facilitate convenient safety management and device maintenance of auxiliary-energy pipeline of fracturing system.

In some example implementations, as shown in FIG. 10, the auxiliary device 5210 of each of the turbine fracturing devices 5200 may include a diesel engine. The auxiliary-energy pipeline 5150 may be configured to deliver diesel fuel.

In some example implementations, the auxiliary device may further include an oil pump, a hydraulic system, and a hydraulic motor. The diesel engine can drive the oil pump, thereby driving the hydraulic system. The hydraulic system drives the hydraulic motor to complete various auxiliary tasks, such as, starting the turbine engine, driving the radiator to work, and the like. The embodiments of the present disclosure are not limited thereto. The auxiliary device may further include a lubricating system and a lubricating oil pump. The diesel engine may be configured to drive the lubricating oil pump, thereby driving the lubricating system in operation.

In some example implementations, as shown in FIG. 10, the auxiliary device 5210 of each of the turbine fracturing devices 5200 may include an electric motor. The auxiliary-energy pipeline 5150 may be configured to deliver electrical power.

In some example implementations, the auxiliary device may further include an oil pump, a hydraulic system, and a hydraulic motor. The electric motor can drive the oil pump, thereby driving the hydraulic system. The hydraulic system drives the hydraulic motor to complete various auxiliary tasks, such as starting the turbine engine, driving the radiator, and the like. The embodiments of the present disclosure are not limited thereto. The auxiliary device may further include a lubricating system and a lubricating oil pump. The electric motor may be configured to drive the lubricating oil pump, thereby driving lubrication needed for various components of the fracturing system.

In some example implementations, as shown in FIG. 10, the fracturing device 5100 may further include a gas supply device 5170, a compressed air supply device 5180 and an auxiliary-energy supply device 5190. The gas supply device 5170 may be connected with the combustion-gas pipeline 5130. The compressed air supply device 5180 may be connected with the compressed air pipeline 5140. The auxiliary-energy supply device 5190 may be connected with the auxiliary-energy pipeline 5150.

In some example implementations, as shown in FIG. 10, the gas supply device 5170 may be connected with a fracturing device 5200 in the first fracturing device group 5110 or the second fracturing device group 5120, which is close to the gas supply device 5170. Then the N+M turbine fracturing devices 5200 of the first fracturing device group 5110 and the second fracturing device group 5120 may be connected in series, to provide fuel gas to the N+M turbine fracturing devices 5200.

In some example implementations, as shown in FIG. 10, each of the turbine fracturing devices 5200 may include a turbine engine 5220, a fracturing pump 5230 and a transmission mechanism 5240. The turbine engine 5220 may be connected with the fracturing pump 5230 through the transmission mechanism 5240. The combustion-gas pipeline 5130 may be configured to provide fuel, such as natural gas, to the turbine engine 5220 of each of the turbine fracturing devices 5200.

In some example implementations, as shown in FIG. 10, the compressed air supply device 5180 may be connected with a fracturing device 5200 in the first fracturing device group 5110 or the second fracturing device group 5120, which is close to the compressed air supply device 5180, then the N+M turbine fracturing devices 5200 of the first fracturing device group 5110 and the second fracturing device group 5120 are connected in series, so as to provide compressed air to the N+M turbine fracturing devices 5200.

In some example implementations, as shown in FIG. 10, the compressed air pipeline 5140 may be configured to provide compressed air to the turbine engine 5220 of each of the turbine fracturing devices 5200.

In some example implementations, as shown in FIG. 10, the auxiliary-energy supply device 5190 may be connected with a fracturing device 5200 in the first fracturing device group 5110 or the second fracturing device group 5120, which is close to the auxiliary-energy supply device 5190, then the N+M turbine fracturing devices 5200 of the first fracturing device group 5110 and the second fracturing device group 5120 are connected in series, so as to provide auxiliary-energy to the auxiliary devices 5210 of the N+M turbine fracturing devices 5200.

In some example implementations, as shown in FIG. 10, the manifold system 5160 may include at least one high and low-pressure manifold skid 5162. Each of the high and low-pressure manifold skids 5162 may be connected with at least one turbine fracturing device 5200, and may be configured to deliver low pressure fracturing fluid to the turbine fracturing device 5200, and to collect high-pressure fracturing fluid output by the turbine fracturing device.

In some example implementations, as shown in FIG. 10, the manifold system 5160 may include a plurality of high and low-pressure manifold skids 5162. The plurality of high and low-pressure manifold skids 5162 may be connected through the first high pressure pipe 5164.

In some example implementations, as shown in FIG. 10, the manifold system 5160 may further include a second high-pressure pipe 5166. The second high-pressure pipe 5166 may be communicated with the fracturing wellhead 5300.

Figure 11:
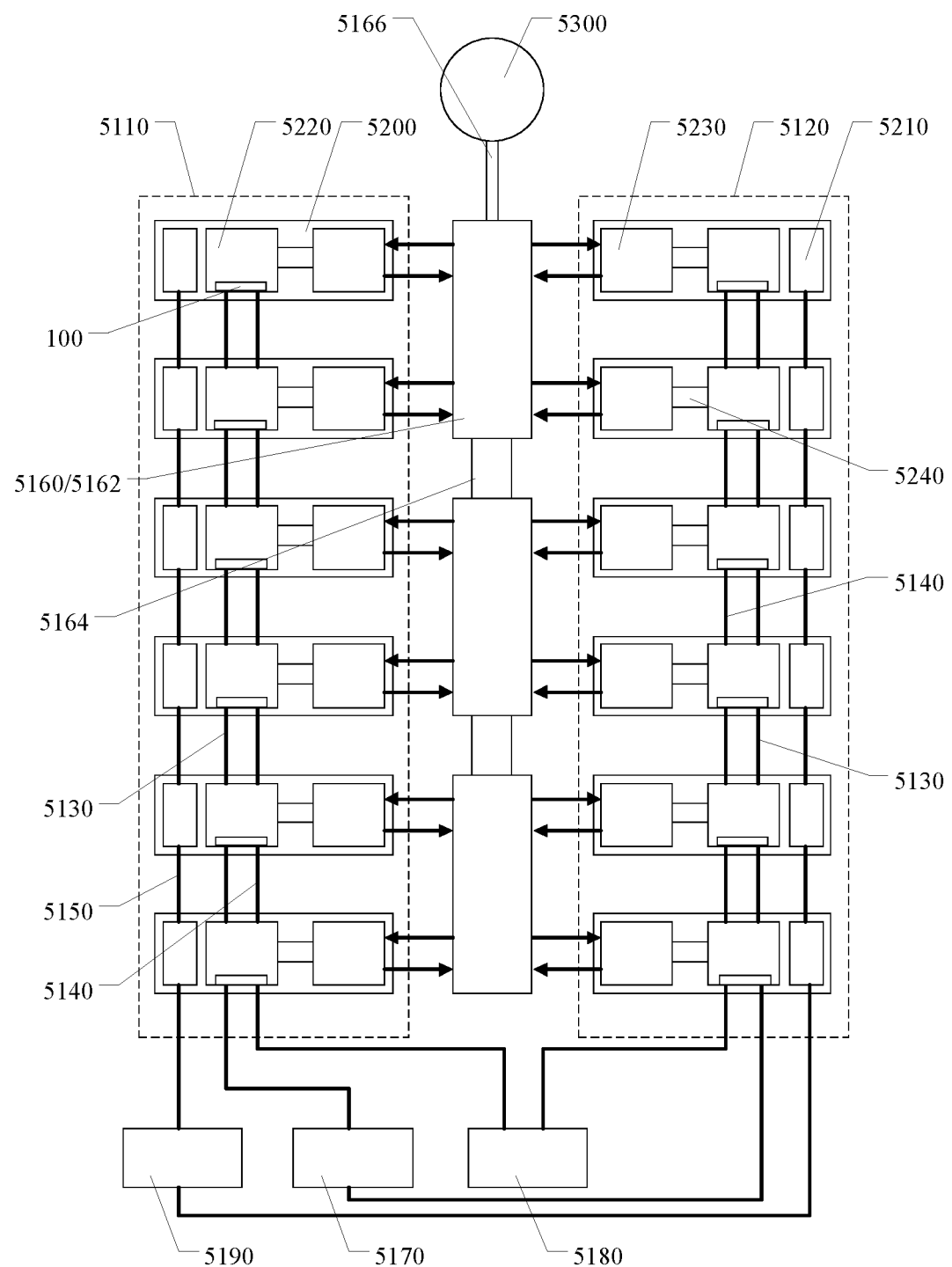
FIG. 11 is a schematic diagram of still another fracturing system provided by an embodiment of the present disclosure.

FIG. 11 shows a schematic diagram of another fracturing system provided by an embodiment of the present disclosure. As shown in FIG. 11, the combustion-gas pipeline 5130 may include a first sub combustion-gas pipeline 5130A and a second sub combustion-gas pipeline 5130B. The first sub combustion-gas pipeline 5130A connects the N turbine fracturing devices 5200 of the first fracturing device group 5110 in series, so as to provide fuel gas to the N turbine fracturing devices 5200. The second sub combustion-gas pipeline 5130B connects the M turbine fracturing devices 5200 of the second fracturing device group 5130B in series, so as to provide fuel gas to the M turbine fracturing devices 5200. In this way, the fracturing system provides fuel gas to the N turbine fracturing devices in the first fracturing device group and the M turbine fracturing devices in the second fracturing device group through the first sub combustion-gas pipeline and the second sub combustion-gas pipeline, respectively, so as to facilitate convenient safety management and device maintenance.

In some example implementations, as shown in FIG. 11, the compressed air pipeline 5140 may include a first sub-compressed air pipeline 5140A and a second sub-compressed air pipeline 5140B. The first sub-compressed air pipeline 5140A connects the N turbine fracturing devices 5200 of the first fracturing device group 5110 in series, so as to provide compressed air to the N turbine fracturing devices 5200. The second sub-compressed air pipeline 5140B connects the M turbine fracturing devices 5200 of the second fracturing device group 5120 in series, to provide compressed air to the M turbine fracturing devices 5200. In this way, the fracturing system provides compressed air to the N turbine fracturing devices in the first fracturing device group and the M turbine fracturing devices in the second fracturing device group through the first sub-compressed air pipeline and the second sub-compressed air pipeline, respectively, so as to facilitate convenient safety management and device maintenance.

In some example implementations, as shown in FIG. 11, the auxiliary-energy pipeline 5150 may include a first sub auxiliary-energy pipeline 5150A and a second sub auxiliary-energy pipeline 5150B. The first sub-auxiliary-energy pipeline 5150A connects the N turbine fracturing devices 5200 of the first fracturing device group 5110 in series, so as to provide auxiliary-energy to the auxiliary devices 5210 of the N turbine fracturing devices 5200. The second sub-auxiliary-energy pipeline 5150B connects the M turbine fracturing devices 5200 of the second fracturing device group 5120 in series, so as to provide auxiliary-energy to the auxiliary devices 5210 of the M turbine fracturing devices 5200. In this way, the fracturing system provides auxiliary-energy to the auxiliary devices of the N turbine fracturing devices in the first fracturing device group and the auxiliary devices of the M turbine fracturing devices in the second fracturing device group through the first sub auxiliary-energy pipeline and the second sub auxiliary-energy pipeline, respectively, so as to facilitate convenient safety management and device maintenance.

With respect to the disclosure above:

(1) The accompanying drawings shows only the structure(s) necessary to explain the present disclosure. Other structure(s) can be derived from the accompanying drawings by a person of ordinary skill in the art.

(2) Unless in conflict, the embodiments of the present disclosure and the features in the embodiments can be combined with each other to obtain new embodiments. For example, each or at least one of the connection lines of FIG. 1 may be implemented as shown in any one of FIGS. 3-5. As such, the mechanism for purging the combustion gas when the fracturing system is not in operation and the mechanism for supply additional gas using the multi-functional pipeline of FIGS. 3-5 may also be applied to the implementation of FIG. 1 for each turbine engine for similar purposes.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention, which is defined by the appended claims and equivalents thereof.

What is claimed is:

1. A gas source system for supplying a gas to a plurality of turbine engines by a fracturing manifold equipment, the gas source system comprising a gas supply device, a gas delivery manifold, a filtering device, a gas detecting system and a plurality of connecting devices, wherein:
   the gas delivery manifold, the filtering device and the gas detecting system are integrated on the fracturing manifold equipment;
   the gas supply device is connected to the gas delivery manifold through the filtering device;
   the gas delivery manifold supplies the gas to the plurality of turbine engines through the plurality of connecting devices in parallel; and the filtering device is integrated in a location on the fracturing manifold equipment away from higher-pressure regions involving a fracturing fluid.

2. The gas source system according to claim 1, further comprising a guard, the guard being integrated on the fracturing manifold equipment and being used to isolate the gas delivery manifold from a fracturing fluid manifold on the fracturing manifold equipment.

3. The gas source system according to claim 2, wherein the guard comprises an isolating board.

4. The gas source system according to claim 3, wherein the guard is made of steel.

5. The gas source system according to claim 1, wherein the gas detecting system comprises a laser gas detecting system.

6. The gas source system according to claim 5, wherein the gas detecting system comprises a pan-and-tilt laser gas detecting system.

7. The gas source system according to claim 5, wherein the pan-and-tilt laser gas detecting system comprises multiple scanning laser gas telemeters and pan-and-tilt mechanisms that drive the multiple scanning laser gas telemeters to detect a multi-dimensional space on site in real time.

8. The gas source system according to claim 1, wherein each of the plurality of connecting devices comprises a connecting pipeline, a valve and a quick-connect interface, the valve being used for an on-off control of gas flow in the connecting pipeline, and the quick-connect interface being used for a fast connection between the connecting pipeline and one of the plurality of turbine engines.

9. The gas source system according to claim 1, wherein at least one of the plurality of connecting devices comprises an additional multi-functional pipeline connected thereof for a purging of the fracturing manifold equipment between operations of the gas source system.

10. The gas source system according to claim 9, wherein each of the at least one of the plurality of connecting devices further comprises a one-way valve configured to forbid a back flow of the gas into the gas supply device and to facilitate the purging of the fracturing manifold equipment between the operations of the gas source system.

* * * * *